United States Patent
Kim et al.

(10) Patent No.: US 9,565,354 B2
(45) Date of Patent: Feb. 7, 2017

(54) MOBILE TERMINAL FOR REFOCUSING OF A CAPTURED IMAGE AND METHOD FOR CONTROLLING THE SAME

(71) Applicant: LG ELECTRONICS INC., Seoul (KR)

(72) Inventors: Jonghwan Kim, Seoul (KR); Hyungjin Kim, Seoul (KR); Woochan Seo, Seoul (KR); Kyungjin Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 14/526,154

(22) Filed: Oct. 28, 2014

(65) Prior Publication Data

US 2016/0044228 A1 Feb. 11, 2016

(30) Foreign Application Priority Data

Aug. 5, 2014 (KR) ........................ 10-2014-0100530

(51) Int. Cl.
*H04N 5/232* (2006.01)
*H04M 1/725* (2006.01)
*G06K 9/00* (2006.01)

(52) U.S. Cl.
CPC ...... *H04N 5/23212* (2013.01); *G06K 9/00221* (2013.01); *H04M 1/72555* (2013.01); *H04N 5/23219* (2013.01); *H04N 5/23293* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2003/0023452 A1* | 1/2003 | Novais | G06Q 30/02 348/211.11 |
| 2008/0095527 A1* | 4/2008 | Lee | G03B 19/00 396/429 |
| 2008/0131019 A1* | 6/2008 | Ng | G06T 5/001 382/255 |
| 2010/0056188 A1* | 3/2010 | Super | H04M 1/72555 455/466 |
| 2011/0081952 A1* | 4/2011 | Song | H04N 1/00307 455/566 |
| 2012/0233531 A1* | 9/2012 | Ma | G06F 17/30265 715/205 |
| 2012/0262271 A1* | 10/2012 | Torgersrud | G06F 21/32 340/5.53 |
| 2013/0342752 A1 | 12/2013 | Sugawara | |

FOREIGN PATENT DOCUMENTS

WO    WO 2014109270 A1 *  7/2014  ......... H04N 5/23219

* cited by examiner

*Primary Examiner* — Dennis Hogue
(74) *Attorney, Agent, or Firm* — Birch, Stewart, Kolasch & Birch, LLP

(57) ABSTRACT

A mobile terminal having a display unit, a camera configured to capture an image, the captured image being re-focusable and a controller configured to perform refocusing of the captured image by changing a focal depth of the captured image is provided. When a transmission request of the captured image is received by the controller, the controller is configured to transmit the captured image after changing the focal depth of the captured image based on an identified recipient of the captured image.

13 Claims, 18 Drawing Sheets

(a)          (b)

(c)

MOBILE TERMINAL FOR REFOCUSING OF A CAPTURED IMAGE AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0100530, filed on Aug. 5, 2014, the contents of which is incorporated by reference herein in its entirety.

BACKGROUND OF THE INVENTION

1. Field of the Invention

This specification relates to a mobile terminal, and more particularly, to a mobile terminal capable of capturing an image including information on different focal distances.

2. Background of the Invention

A terminal is broadly categorized as a mobile terminal and a stationary terminal. The mobile terminal is further categorized as a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

Owing to such improvements, the mobile terminal may be provided with a camera including a plurality of lenses. Further, it is possible to capture a subject at a plurality of focal depths, through the camera.

SUMMARY OF THE INVENTION

Therefore, an aspect of the detailed description is to provide a mobile terminal capable of changing a focal depth of an image input through a camera having a plurality of lenses, based on a situation, and a method of controlling the same.

Another aspect of the detailed description is to provide a mobile terminal capable of changing a focal depth of an image, based on a user who is to receive or view the image, and a method of controlling the same.

To achieve these and other advantages and in accordance with the purpose of this specification, as embodied and broadly described herein, the present invention provides a mobile terminal having a display unit, a camera configured to capture an image, the captured image being re-focusable and a controller configured to perform refocusing of the captured image by changing a focal depth of the captured image. When a transmission request of the captured image is received by the controller, the controller is configured to transmit the captured image after changing the focal depth of the captured image based on an identified recipient of the captured image.

In another aspect, the present invention provides a mobile terminal including a display unit, a controller configured to change a focal depth of a re-focusable image when the re-focusable image has been received by the mobile terminal and a memory configured to store information related to a user of the mobile terminal, the information including a pre-stored face image. When the mobile terminal receives the re-focusable image, the controller is configured to compare the pre-stored face image to the re-focusable image and change the focal depth of the re-focusable image when a region of the re-focusable image corresponds to the pre-stored face image.

In yet another aspect, the present invention provides a method of controlling a mobile terminal including generating a re-focusable image by a camera of the mobile terminal, storing the re-focusable image, when transmission of the re-focusable image is requested, determining a recipient of the image, changing a focal depth of the re-focusable image based on the determined recipient and transmitting the re-focusable image with the changed focal depth to the determined recipient.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail of the embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a flexible glass display apparatus (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility purposes.

Figure 1A:
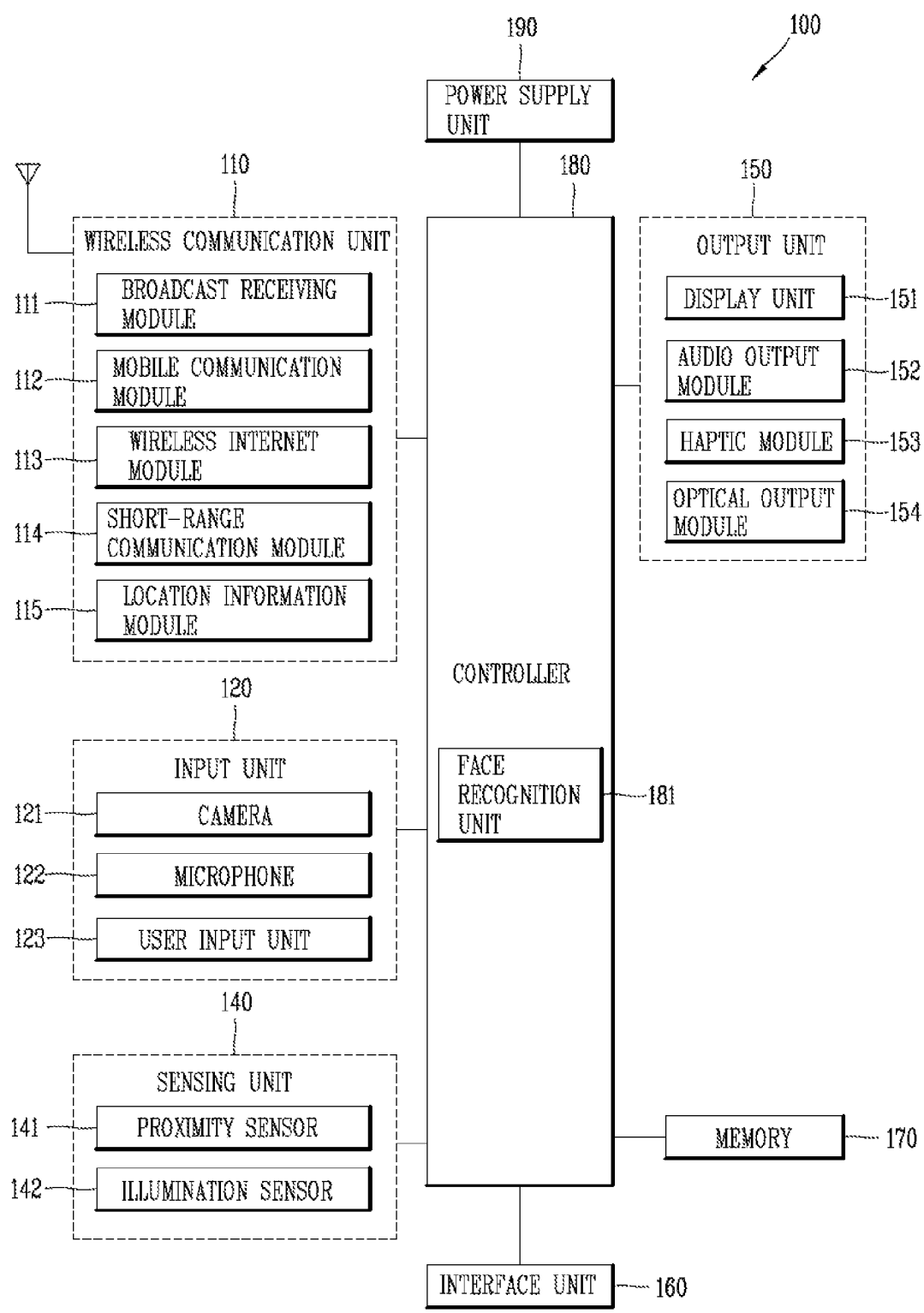
FIG. 1A is a block diagram illustrating a mobile terminal according to an embodiment of the present invention.
Figure 1B:
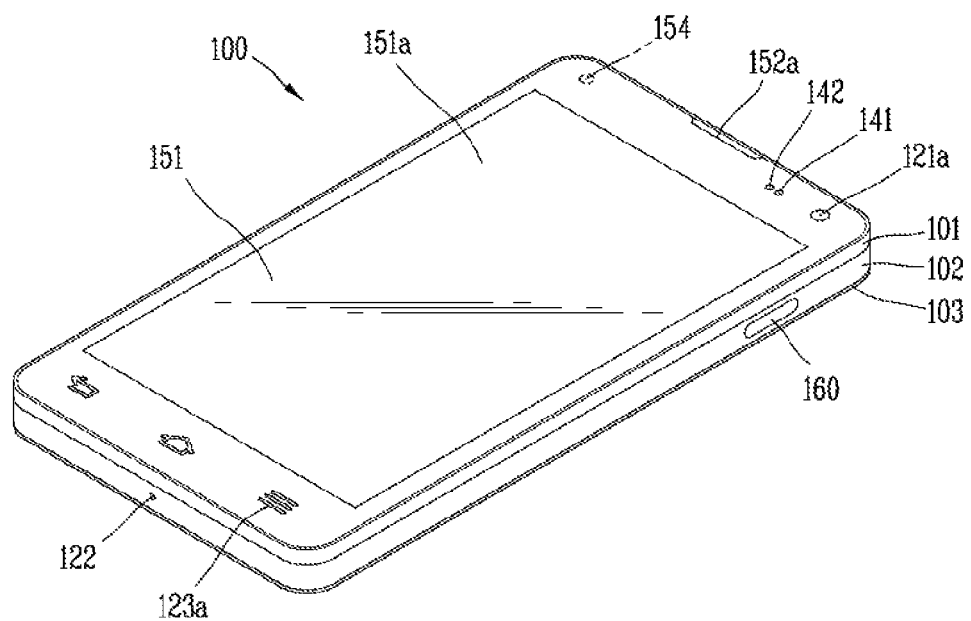
FIGS. 1B to 1D are diagrams illustrating a mobile terminal according to an embodiment of the present invention, when viewed from different directions.
Figure 1C:
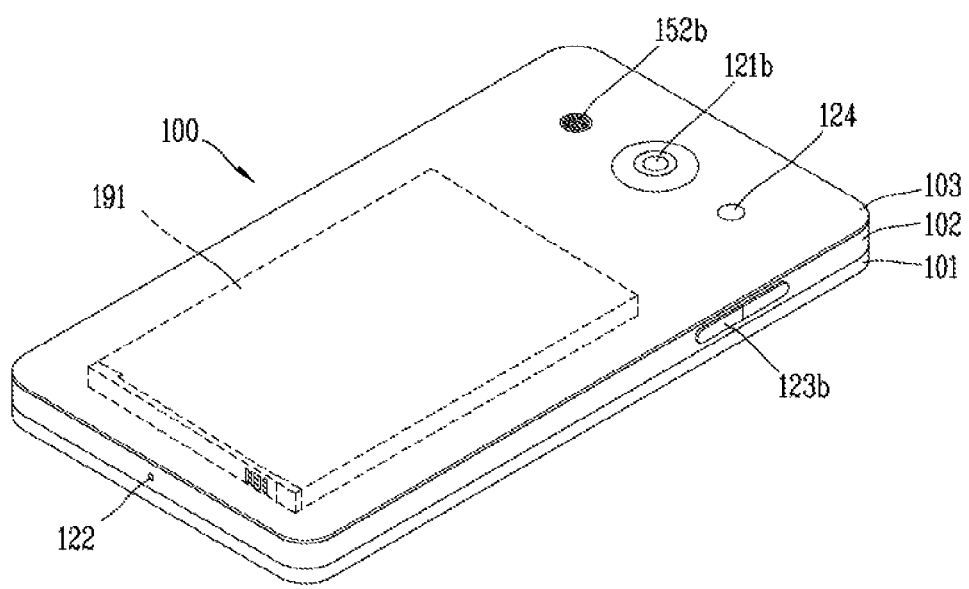

FIG. 1A is a block diagram illustrating a mobile terminal according to an embodiment of the present invention. FIGS. 1B and 1C are diagrams illustrating a mobile terminal according to an embodiment of the present invention, when viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal 100 is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal 100, the surrounding environment of the mobile terminal 100, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a mobile terminal 100 according to various embodiments to be explained later. The operation or the control method of the mobile terminal 100 may be implemented on the mobile terminal 100 by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external flexible glass display apparatus, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal 100 and a network where another mobile terminal 100 (or an external server) is located, via wireless area networks. One example of the wireless area networks is a wireless personal area networks.

In some embodiments, another mobile terminal (which may be configured similarly to mobile terminal 100) may be a flexible glass display apparatus, for example, a smart watch, a smart glass or a head mounted display (HMD), which can exchange data with the mobile terminal 100 (or otherwise cooperate with the mobile terminal 100). The short-range communication module 114 may sense or recognize the flexible glass display apparatus, and permit communication between the flexible glass display apparatus and the mobile terminal 100. In addition, when the sensed flexible glass display apparatus is a device which is authenticated to communicate with the mobile terminal 100, the controller 180, for example, may cause transmission of data processed in the mobile terminal 100 to the flexible glass display apparatus via the short-range communication module 114. Hence, a user of the flexible glass display apparatus may use the data processed in the mobile terminal 100 on the flexible glass display apparatus. For example, when a call is received in the mobile terminal 100, the user may answer the call using the flexible glass display apparatus. Also, when a message is received in the mobile terminal 100, the user can check the received message using the flexible glass display apparatus.

The location information module 115 is generally configured to detect, calculate, derive or otherwise identify a position of the mobile terminal 100. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the flexible glass display apparatus.

As one example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal depths to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal 100 at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like. The controller 180 generally cooperates with the sending unit 140 to control operation of the mobile terminal 100 or execute data processing, a function or an operation associated with an application program installed in the mobile terminal 100 based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may convert and output as sound audio data received from the wireless communication unit 110 or stored in the memory 170 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer or the like.

A haptic module 153 generates various tactile effects the user may feel. A typical example of the tactile effects generated by the haptic module 153 is vibration. The strength and pattern of the haptic module 153 can be controlled. For example, different vibrations may be combined to be output or sequentially output.

Besides vibration, the haptic module 153 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 153 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

An optical output module 154 can output a signal for indicating an event generation using light from a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 of the mobile terminal according to an embodiment of the present invention may further store therein image information on a plurality of persons. Such image information may be a face image corresponding to a specific person, which may be provided from an electronic name card received from other mobile terminal. Alternatively, such image information may be provided from a server which provides chatting service or social network service (SNS).

The memory 170 may store therein not only such image information, but also specific information. For instance, the memory 170 may store therein contact information such as a phone number or an e-mail address, in correspondence to an image related to the specific person. In this instance, the image information may be stored in the form of profile information included in a phone directory of the mobile terminal 100.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

When image transmission is requested from the camera 121, the controller 180 of the mobile terminal according to an embodiment of the present invention may change a focal depth of the transmission-requested image. The controller 180 can change a specific region of the image directly selected by a user. Alternatively, the controller 180 can change a focal depth of the image, based on a region where a specific subject (e.g., a specific person) has been displayed on the image.

For instance, the controller 180 can detect face-recognizable parts from the transmission-requested image. Then the controller 180 can perform face recognition with respect to the detected parts, thereby recognizing persons displayed on the detected regions. For this, the controller 180 can be provided with a face recognition unit 181. As shown in FIG. 1A, the face recognition unit 181 may be included in the controller 180, or may be separately provided outside the controller 180.

For such face recognition, the controller 180 can use images of a plurality of pre-stored persons. Such images may be profile information on the plurality of persons, the profile information including photos. Alternatively, such images may be images used by the plurality of persons during chatting or social network service (SNS). Such profile information or images may be pre-stored in the memory 170, or may be received from a specific member during chatting or SNS. Alternatively, such profile information or images may be received from a server which provides a chatting function, or a server which provides an SNS function.

If a region where a specific person has been recognized is detected from the image as a face recognition result, the controller 180 can determine the specific person as a recipient of the image based on a user's selection. In this instance, the controller 180 can change a focal depth of the image based on the selected specific person, and may transmit the image having a changed focal depth to the determined recipient.

In addition, the controller 180 can change a focal depth of the received image based on a user of the mobile terminal 100. For instance, upon receipt of an image, the controller 180 can detect, from the received image, a region where a user has been displayed, using identification information on the pre-stored user, i.e., profile information on the user, or an image used by the user during chatting or SNS. Then the controller 180 can change a focal depth of the received image, based on the detected region. In the mobile terminal 100 according to an embodiment of the present invention, a focal depth of a received image is automatically changed based on a pre-stored user. Thus, the user can be provided with a focused image based on the user.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unitary body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this instance, a hole independently formed to output audio sounds can be hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 provided on the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at almost any location of the rear side of the terminal body. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a BLUETOOTH port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, the second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities. A flash 124 is shown adjacent to the second camera 121b. When an image of a subject is captured with the camera 121b, the flash 124 may illuminate the subject.

The second audio output module 152b can be located on the rear side of the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance. The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
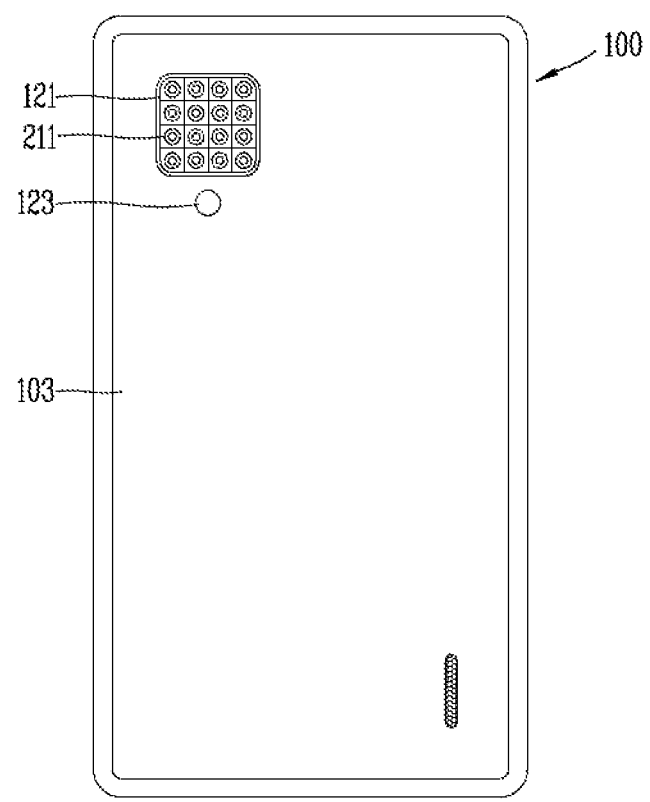

The mobile terminal 100 according to an embodiment of the present invention, which can include at least one of the above components, may include a camera 121 configured to capture an image including information on different focal distances (lengths). For instance, as shown in FIG. 1D, the camera 121 may be provided a plurality of lenses arranged along a plurality of lines. The camera 121 may capture an image having different focal distances (depth information), through the plurality of lenses. Such a camera having a plurality of lenses may be referred to as an 'array camera'. In the array camera, the plurality of lenses may be arranged in the form of a matrix.

As shown in FIG. 1D, the array camera may be composed of a plurality of small camera modules each having a lens and each of the camera modules may have a different focal length (depth information). Thus, the array camera may capture a plurality of images having a plurality of focal depths, through a single capturing. Under such configuration, the array camera may obtain a high pixel image by synthesizing images captured by the camera modules, and may generate a 3D image using a time difference effect occurring due to differences among the focal distances. The array camera may be configured so that each of the camera modules can have a differently-set aperture value. Thus, the amount of light transmitted to the lens of each camera module may be different.

The array camera stores a plurality of images captured at different focal depths through the plurality of lenses. An image synthesized by the plurality of images may have a different focal depth, according to a basis image captured by one of the plurality of lenses. The array camera may be configured such that each of the images captured by the plurality of lenses stores distance information between each lens and the subject. Thus, each pixel of the synthesized image includes distance information between each lens and the subject. In this instance, the controller 180 can perform refocusing to change a focal depth of the synthesized image, based on distance information on a pixel corresponding to a region selected from the synthesized image by a user.

Hereinafter, an image, which has a variable focal region and a focal depth changed according to the focal region, is referred to as an 'all in focus image'. Such all in focus image can have its focal depth changed not only when captured, but also after captured, based on images simultaneously captured and having different focal depths. Thus, the controller 180 can provide a user with an image having a focal region variable according to a user's selection, the image having a focal distance adjusted according to a changed focal region.

Figure 2:
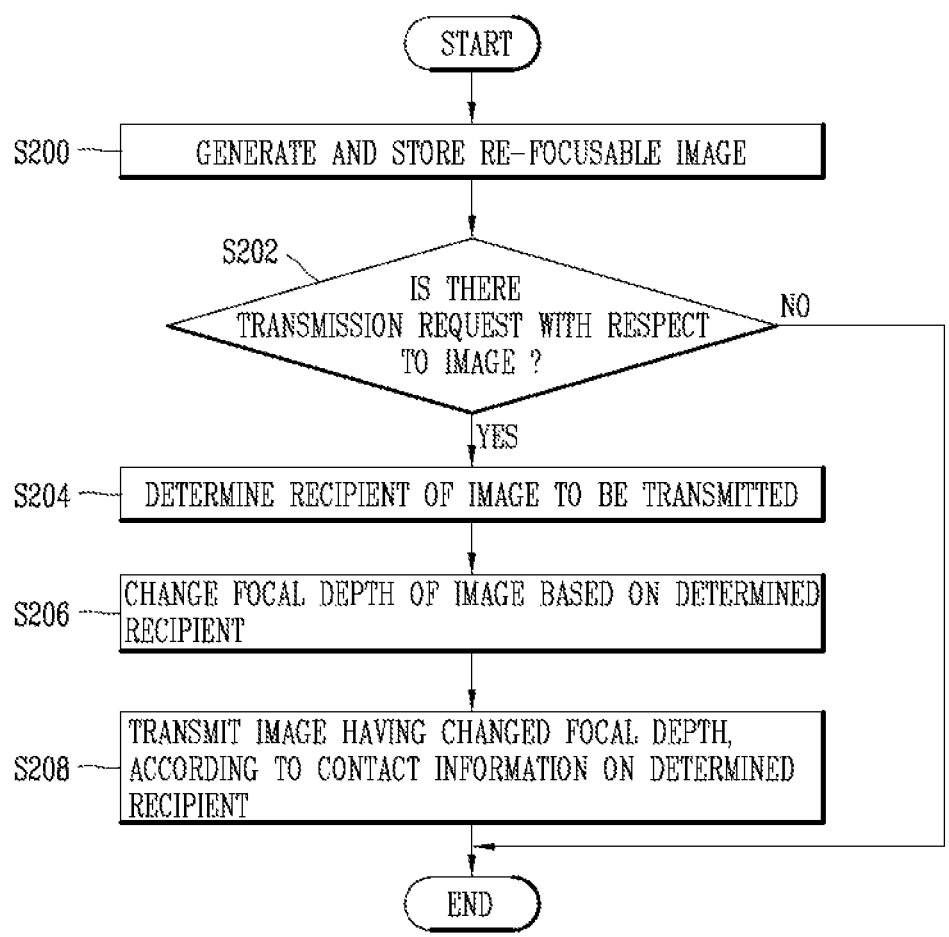
FIG. 2 is a flowchart illustrating a method of transmitting an image having a changed focal depth according to a recipient, in a mobile terminal according to an embodiment of the present invention.

Hereinafter, preferred embodiments of a control method by the mobile terminal according to an embodiment of the present invention will be explained with reference to the attached drawings. FIG. 2 illustrates a method of changing a focal depth of an image according to a recipient, and transmitting the image having the changed focal depth, when image transmission is requested from a mobile terminal according to an embodiment of the present invention. Referring to FIG. 2, the mobile terminal 100 according to an embodiment of the present invention may generate the all in focus image using the plurality of lenses thereof, and may store it therein (S200). The 'all in focus image' may mean an image of which focal depth can be changed (focus changeable image), i.e., a re-focusable image.

The controller 180 determines whether a user has requested for transmission of the image generated and stored in S200 (S202). The transmission request with respect to the image may be various. For instance, a user may directly attach the image to a message or a mail to be transmitted to a specific recipient, or may upload the image to an SNS bulletin board. Alternatively, the user may post the image during chatting. In this instance, the controller 180 can determine that transmission of the image has been requested.

The transmission request may be also performed with respect to a pre-stored image, as well as the image stored in S200. That is, the controller 180 can sense in S202 whether there is a transmission request with respect to an image being provided in the form of a preview image, while a user is capturing an image. The controller 180 can also sense whether there is a transmission request with respect to one of pre-stored images (captured images).

If there is a transmission request with respect to an all in focus image as a determination result in S202, the controller 180 can determine a recipient of the transmission-requested image (S204). For instance, when a user has directly input a specific person's contact information such as an e-mail address or a phone number, the controller 180 can determine the specific person as a recipient of the transmission-requested image. When a user performs a chatting function or an SNS-related function, the controller 180 can determine a specific person related to the function which is being currently executed, i.e., a chatting member or a user who is to download the transmission-requested image from an SNS bulletin board, as a recipient of the transmission-requested image.

The controller 180 can determine a recipient of the transmission-requested image, based on the transmission-requested image. In this instance, the controller 180 can perform face recognition with respect to the transmission-requested image, and may determine a specific person recognized from the transmission-requested image, as a recipient of the transmission-requested image according to a user's selection.

For instance, the controller 180 can perform face recognition, thereby detecting part recognized as a person's face from the transmission-requested image. Then the controller 180 can compare the detected part with pre-stored images, i.e., images included in profile information of a pre-stored phone directory, thereby searching for a facial image having a feature point matching the detected part. Upon search of the facial image, the controller 180 can recognize the transmission-requested image as an image, the image captured in a state where a person corresponding to the searched facial image has been set as a subject.

In this instance, the controller 180 can display, on the image, information on a person corresponding to the searched facial image. For instance, the controller 180 can display face-recognizable parts of the transmission-requested image, in a distinguished manner from other regions. And the controller 180 can display information on the searched person, around the face-recognizable parts. The information on the searched person may be identification information such as a name or an ID.

When at least one of the face-recognizable parts is selected by a user, the controller 180 can determine at least one person corresponding to the selected region, as a recipient of the transmission-requested image.

Upon determination of the recipient of the transmission-requested image in S204, the controller 180 can change a focal depth of the transmission-requested image based on the determined recipient (S206). For instance, the controller 180 can detect, from the transmission-requested image, a region where the recipient has been displayed. Then the controller 180 can change a focal depth of the transmission-requested image based on the detected region. Alternatively, the controller 180 can change a focal depth of the transmission-requested image, using an image received from a lens of the plurality of lenses, the lens correctly focusing the recipient.

Once the focal depth has been changed in S206, the controller 180 can transmit the image having a focal depth changed according to contact information on the recipient determined in S204 (S208). The controller 180 can transmit the image according to a transmission type sensed in S202. For instance, if a transmission type sensed in S202 is a message or an e-mail to a specific person, the controller 180 can control contact information directly input by a user, or contact information acquired from pre-set information on a person corresponding to at least one region selected by a user, to be automatically input.

If an image transmission request sensed in S202 has occurred while performing a chatting function or an SNS function, the controller 180 can upload the transmission-requested image to a server which provides the chatting function or an SNS server to which a user has subscribed. In this instance, the controller 180 does not need to designate a specific person who is to receive the transmission-requested image.

However, even when a user uploads an image to a chatting server or an SNS server, the controller 180 can preset a specific person who can receive the image. For instance, when a user does group chatting or uploads an image to an SNS server, the controller 180 can control the image to be received or viewable by only a specific member among chatting members. For this, the controller 180 can set an open condition of the image to be transmitted or uploaded. Upon setting of such open condition, it may be restricted to view even an image posted during group chatting or an image uploaded to an SNS server.

Figure 3:
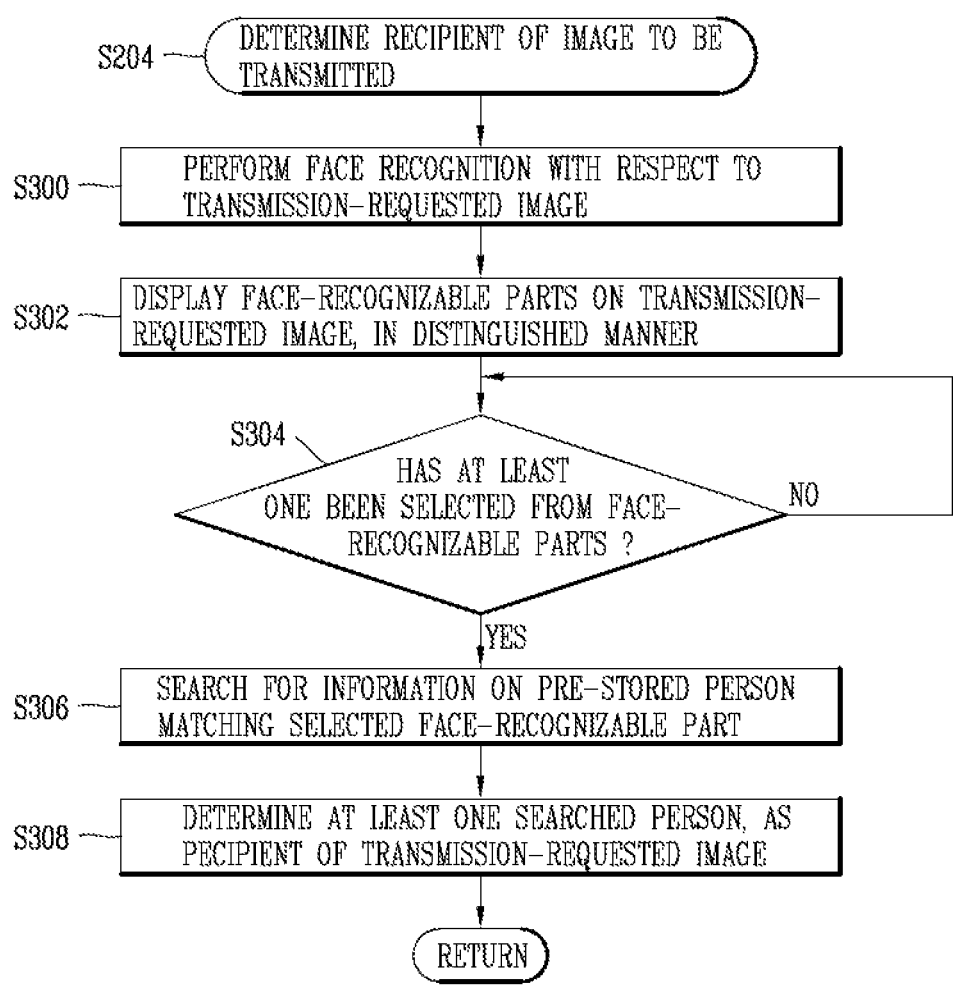
FIG. 3 is a flowchart illustrating a method of determining a recipient of an image to be transmitted according to the method of FIG. 2.

As previously mentioned, the controller 180 of the mobile terminal 100 according to an embodiment of the present invention may determine a recipient of a transmission-requested image, based on a user's selection. FIG. 3 is a flowchart illustrating a method of determining a recipient of an image to be transmitted, according to the method of FIG. 2. Referring to FIG. 3, when a transmission request with respect to a specific image has been sensed in S204, the controller 180 of the mobile terminal 100 according to an embodiment of the present invention may determine a recipient of the transmission-requested image, based on a user's selection. In this instance, the controller 180 can perform face recognition with respect to the transmission-requested image (S300).

In S300, face-recognizable parts may be detected from the transmission-requested image. For instance, the controller 180 can recognize, from the transmission-requested image, regions where a person's eyes, nose and mouth have been displayed. Then the controller 180 can detect face-recognizable parts of the transmission-requested image, based on a shape of the recognized facial parts and a distance therebetween.

Upon detection of the face-recognizable parts in S300, the controller 180 can display the detected parts in a distinguished manner from other parts of the image (S302). For instance, the controller 180 can display a guide line of a preset color at the periphery of the face-recognizable parts. Alternatively, the controller 180 can display the face-recognizable parts in a preset other color in a distinguished manner. The controller 180 can sense whether at least one of the face-recognizable parts has been selected by a user (S304). For instance, if a user's touch input has been sensed from one of the face-recognizable parts, the controller 180 can determine that the corresponding face-recognizable part has been selected by the user. When at least one of the face-recognizable parts has been selected by a user in S304, the controller 180 can determine a recipient of the selected image, using a facial image displayed on the selected part. That is, the controller 180 can search for an image matching a facial image displayed on the selected region, among pre-stored facial images (S306). The controller 180 can determine a person corresponding to the searched image, as a recipient of the selected image (S308).

The pre-stored facial images in S306 may be images included in a phone directory stored in the mobile terminal 100, or may be images included in an electronic name card or a profile image received from a specific person. Such images may be collected or pre-stored by a user, or may be information included in history information stored while a chatting function or an SNS function is being performed.

In this instance, the controller 180 can search for a matching image among the pre-stored facial images. If there is a matching image, the controller 180 can determine a person corresponding to the image as a recipient. The controller 180 can detect contact information on a person corresponding to the matching image, from pre-stored person information including the matching image, i.e., profile information of a phone directory, etc. In this instance, the detected contact information may be automatically input as a destination address of the transmission-requested image.

Upon determination of a recipient, the controller 180 can change a focal depth of the selected image, based on the determined recipient (S206). Then the controller 180 can transmit the image having a changed focal depth (S208). Thus, in the mobile terminal 100 according to an embodiment of the present invention, once a user touches a region of the transmission-requested image where a specific recipient has been displayed, the image may be transmitted to the specific person after its focal depth has been changed based on the specific person.

As previously mentioned, upon determination of a recipient in the mobile terminal 100 according to an embodiment of the present invention, a focal depth of the transmission-requested image is changed based on the determined recipient. Upon selection of a specific region from the selected image, the controller 180 can change a focal depth of the selected image based on the selected region. For instance, the controller 180 can change a focal depth of the image, based on a distance value pre-stored in each pixel of the region selected by a user in S304, the distance value between the camera 121 and a subject (i.e., the determined recipient). In this instance, the controller 180 can perform out-focusing with respect to pixels which are out of a range, the range similar to or the same as the region selected by the user. Thus, an image, focused based on the region selected by the user, may be generated.

The controller 180 can re-synthesize images captured by other lenses based on one lens, among the plurality of lenses of the camera 121. For instance, the controller 180 can change a focal depth of an image, based on focal distances of a plurality of lenses of the camera 121, i.e., based on distance values between the lenses and a subject. In this instance, the controller 180 can synthesize an image, based on a distance value between the subject and the camera 121, the distance value pre-stored in pixels of the region selected by the user. More specifically, the controller 180 can synthesize an image, based on an image captured by a lens corresponding to the distance value, among the plurality of lenses. Thus, an image, having a focal depth changed based on a determined recipient, may be generated.

Figure 4:
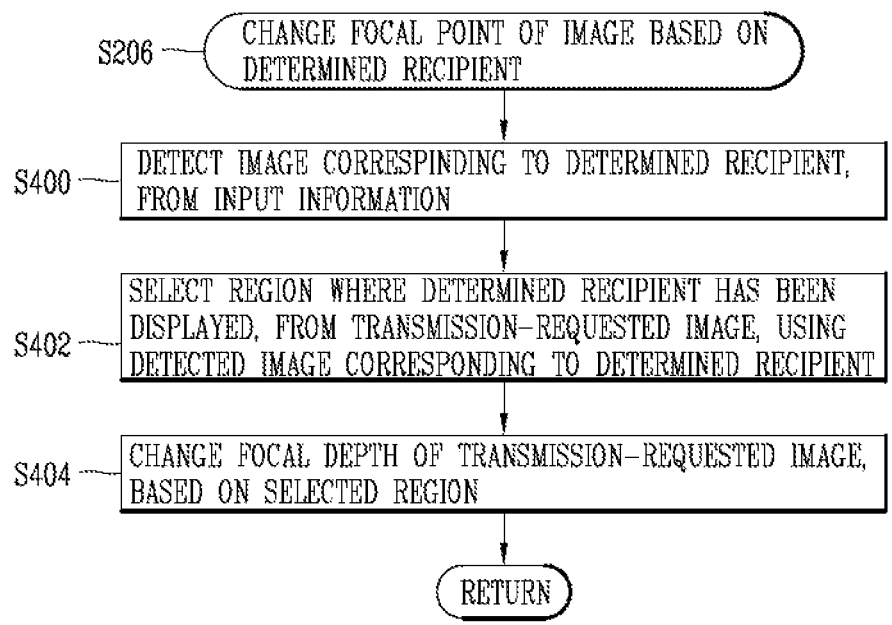
FIG. 4 is a flowchart illustrating a method of changing a focal depth of an image to be transmitted, based on a determined recipient, according to the method of FIG. 2.

However, even when a user transmits an image to a chatting member, or a case where a user directly inputs address information on a specific person as address information on the transmission-requested image, a focal depth of the selected image may be changed based on a determined recipient. FIG. 4 illustrates a method of changing a focal depth of an image to be transmitted based on a specific recipient, when a user has directly input address information on the specific recipient, among the a method of FIG. 2.

If a user has input information on a recipient of the selected image, the controller 180 detects, from the information, an image corresponding to the recipient (S400). For instance, if a user has input a recipient's contact information such as a name, a phone number or an e-mail, the controller 180 can search for a face image of the recipient corresponding to the input contact information, from profile information stored in a pre-stored phone directory, etc.

Upon detection of a facial image of the recipient corresponding to the input contact information in S400, the controller 180 can detect, from the selected image, a region where the recipient has been displayed, using the searched face image (S402).

For instance, the controller 180 can recognize an image of a recipient detected in S400. Then the controller 180 can detect, from the selected image, a region where an image corresponding to the recognized recipient has been displayed. That is, the controller 180 can analyze feature points of the determined recipient, i.e., a shape of eyes, a nose and a mouth, a distance therebetween, etc., based on the recipient's pre-stored face image. Then the controller 180 can select, from the selected image, a shape corresponding to the analyzed result has been displayed.

When a region of the transmission-requested image has been selected, the controller 180 can change a focal depth of the selected image, based on the selected region (S404). For instance, in S404, a focal depth of the selected image may be changed based on a distance value pre-stored in pixels of the selected region, the distance value between the camera 121 and a subject.

In the mobile terminal according to an embodiment of the present invention, not only when a user directly selects for part of a transmission-requested image, but also when a user firstly sets a recipient (i.e., a user inputs information on a recipient such as a name or contact information), a focal depth of the selected image may be changed based on the designated recipient.

In the previously mentioned configuration, an image having a changed focal depth is transmitted. However, an all in focus image or a focus changeable image may be transmitted.

The controller 180 can transmit one of an image having a changed focal depth and an all in focus image, according to whether a recipient's mobile terminal has a refocusing function or not. Whether the recipient's mobile terminal supports a refocusing function may be determined based on information on a type of the recipient's mobile terminal. Information on a type of the recipient's mobile terminal may be received through a server, etc., the server which provides a communication network function to the recipient's mobile terminal.

If it is not clear whether the recipient's mobile terminal supports a refocusing function or not, the controller 180 can transmit both an image having a changed focal depth and an all in focus image. In this instance, the recipient may use any one of the two images.

Not only in the case of transmitting an image to a specific recipient, but also when doing group chatting or uploading an image to an SNS server, etc., the controller 180 can determine that a transmission request with respect to the image has occurred. In this instance, the controller 180 can upload an image having a focal depth changed based on a specific person, to a server which provides the group chatting function, or an SNS server.

The controller 180 can upload not only an image having a focal depth changed based on a specific person, but also an all in focus image, to the group chatting server or the SNS server. In this instance, members of the group chatting or subscribers of the SNS who have downloaded the uploaded image may receive the all in focus image, and may change a focal depth of the all in focus image based on a specific region.

Not only when transmitting an image, but also when receiving an image, the mobile terminal 100 according to an embodiment of the present invention may automatically change a focal depth of a received image. For instance, when the mobile terminal 100 according to an embodiment of the present invention has downloaded an image from an SNS server or a chatting server, the controller 180 can detect, from the downloaded image, a region where a user pre-stored in the mobile terminal 100 has been displayed. If there is a region where the user has been displayed, the controller 180 can automatically change a focal depth of the downloaded image based on the user.

Figure 5:
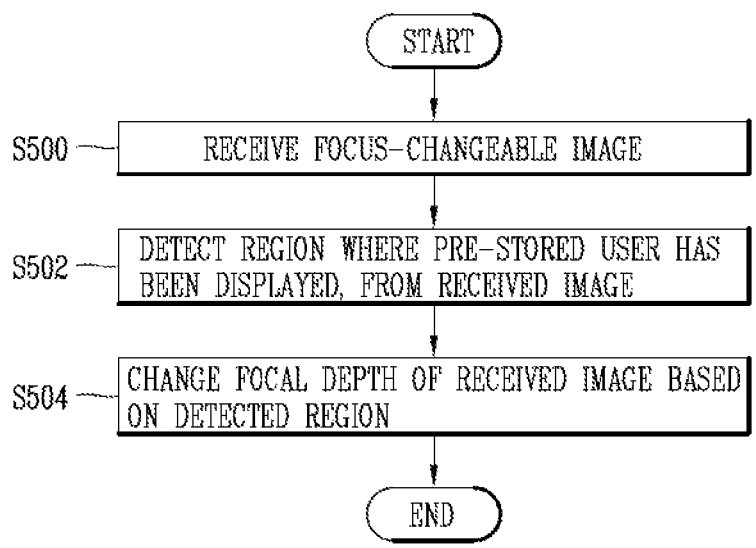
FIG. 5 is a flowchart illustrating a method of changing a focal depth of a received image in a mobile terminal according to an embodiment of the present invention.

FIG. 5 illustrates a method of changing a focal depth of a received image, in the mobile terminal according to an embodiment of the present invention. Referring to FIG. 5, the controller 180 of the mobile terminal 100 according to an embodiment of the present invention may receive a focus changeable image, i.e., an all in focus image (S500). Upon receipt of the all in focus image, the controller 180 can detect, from the received image, a region where a pre-stored user has been displayed (S502).

For instance, the controller 180 can recognize feature points of a user's face, i.e., a shape of eyes, a nose and a mouth, a distance therebetween, an outline thereof, etc., based on a user's pre-stored face image. Then the controller 180 can detect a region where the user has been displayed, from the received image, based on the recognized information. Upon detection of the region where the user has been displayed, the controller 180 can change a focal depth of the received image based on the detected region (S504). In this instance, a distance value between the camera and a subject, which has been pre-stored in each of pixels of the detected region, may be used.

In the mobile terminal 100 according to an embodiment of the present invention, when receiving a focus changeable image (i.e., an all in focus image) rather than an image having a changed focal depth, a focal depth of the received image may be automatically changed based on information on a user of the mobile terminal 100. Thus, when the user of the mobile terminal 100 corresponds to one of persons captured as a subject of the received image, the received image may be provided to the user after its focal depth is changed based on a region of the received image where the user has been displayed.

The mobile terminal 100 according to an embodiment of the present invention may restrict change of a focal depth of an image to be received at the time of transmitting the image. For instance, when uploading an all in focus image to a server which provides a group chatting function, an SNS server, etc., the controller 180 of the mobile terminal 10 according to an embodiment of the present invention may upload preset information on a focus changeable specific person. Thus, if a specific person of which focal depth is to be changed has not been preset by the user, a focal depth of the downloaded image may not be changed and display of the downloaded image may be restricted, even when a user's chatting member or a member who belongs to the same SNS as the user has downloaded an image posted to the group chatting server or an SNS server.

For instance, the controller 180 can perform face recognition with respect to the image to be uploaded, and may receive, from a user, at least one face-recognizable region of the image. In this instance, the controller 180 can recognize a person corresponding to the face-recognizable region as a person allowed to have a changed focal depth of the image or to download the image. In this instance, the controller 180 can upload information on the person allowed to have a changed focal depth of the image or to download the image, together with the image to be uploaded. The uploaded information may be encoded by a preset security means, for prevention of leakage of person information.

In the mobile terminal 100 according to an embodiment of the present invention, not only the image to be uploaded, but also information on the person allowed to have a changed focal depth of the image or to download the image, may be downloaded.

The controller 180 of the mobile terminal 100 may determine whether to change a focal depth of the downloaded image or not, or whether to restrict display of the downloaded image or not, based on the downloaded information. That is, if a user of the mobile terminal 100 has been allowed by a person who has uploaded the image (uploader), the controller 180 can change a focal depth of the downloaded image, based on a region where the user of the mobile terminal 100 has been displayed. However, if the user of the mobile terminal 100 is not a person allowed to have a changed focal depth of the downloaded image or to receive the downloaded image, the controller 180 does not change a focal depth of the downloaded image, or may restrict display of the downloaded image.

In the mobile terminal 100 according to an embodiment of the present invention, the controller 180 can set a specific condition for determining whether to display the image or not, instead of uploading information on a specific person. For instance, the mobile terminal 100 may change a focal depth of the image based on persons captured as a subject. Alternatively, the mobile terminal 100 may set a condition to display the image without any restrictions to the uploaded image. That is, when uploading an image, the mobile terminal 100 according to an embodiment of the present invention may be provided with information on a preset specific person, or an open range including a specific condition. In this instance, the mobile terminal 100 which has received the image may change a focal depth of the received image, or may determine whether to display the received image or not, based on the open range.

Figure 6:
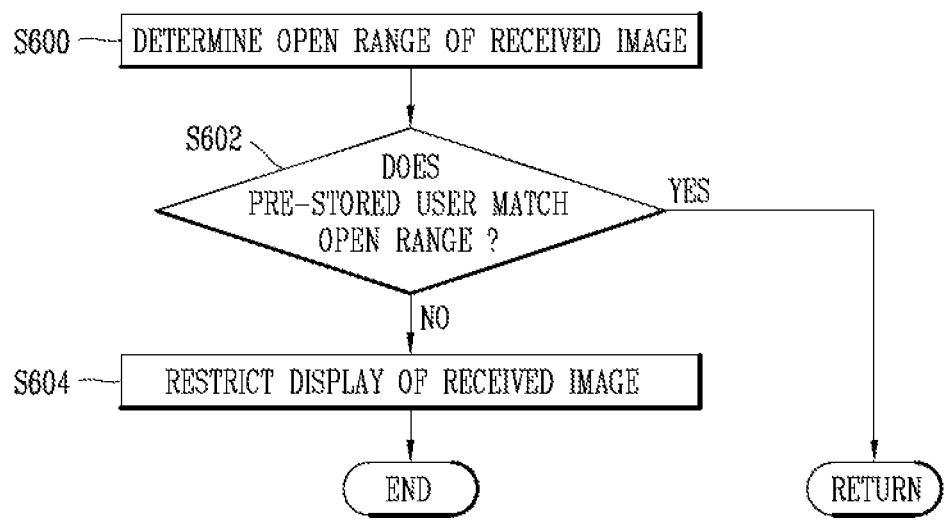
FIG. 6 is a flowchart illustrating a method of determining whether to display a received image or not, according to whether a user matches a preset open range.

FIG. 6 is a flowchart illustrating a method of determining whether to display a received image or not, based on whether a user of the mobile terminal matches a preset open range. Referring to FIG. 6, when a focus changeable image has been received in S500, the controller 180 of the mobile terminal 100 according to an embodiment of the present invention may determine an open range of the image, based on information received together with the image (S600). For instance, as previously mentioned, the open range may be information on a specific person, or a preset specific condition. When the open range is information on a specific person, the controller 180 can determine whether a user of the mobile terminal 100 which has received the image matches a specific person pre-stored in the open range (S602). If the user pre-stored in the mobile terminal 100 which has received the image matches the open range as a determination result in S602, the controller 180 returns to S504. Then the controller 180 can change a focal depth of the received image, based on the user of the mobile terminal 100 which has received the image.

On the contrary, if the user of the mobile terminal 100 which has received the image does not match the open range as a determination result in S602, the controller 180 can restrict display of the received image (S604). For instance, the controller 180 does not change a focal depth of the received image. Alternatively, the controller 180 can display the received image in the form of an out-focused image, a black-and-white image, or an image having a resolution of a predetermined level or less than.

When the open range is related to a specific condition, the controller 180 of the mobile terminal 100 which has received the image may determine whether a pre-stored user matches the open condition or not in S602. For instance, the open condition may be to change a focal depth of the image based on persons captured as a subject of the received image, or persons who belong to a specific group set by a user, or may be to display the image without any restrictions.

In this instance, the controller 180 can determine whether a user matches the preset open condition, based on pre-stored user information. For instance, if the open condition is to allow persons captured as a subject of the received image, to have a changed focal depth of the image or to receive the image, the controller 180 can recognize a user's face from a user's pre-stored image in S602. Then the controller 180 can determine whether the received image has a region where a shape corresponding to the user's recognized face has been displayed, based on the user's recognized face. If the received image has a region where a shape corresponding to the user's recognized face has been displayed as a determination result in S602, the controller 180 can determine that the user of the mobile terminal 100 matches the specific condition. Thus, the controller 180 can return to S504, and may change a focal depth of the received image based on the region where the user's face has been displayed.

On the contrary, if the received image does not have a region where a shape corresponding to the user's recognized face has been displayed as a determination result in S602, the controller 180 can proceed to S604 so that a focal depth of the received image may not be changed, or so that display of the received image may be restricted. If display of the image is restricted, the controller 180 can display the received image in the form of an out-focused image, a black-and-white image, etc.

In the above configuration, when the mobile terminal according to an embodiment of the present invention transmits an image focused based on a specific recipient, or receives a focus changeable image, a focal depth of the received image is automatically changed based on a user of the mobile terminal.

Hereinafter, an example of a screen, which is to be displayed on the display unit when transmitting or receiving the focus changeable image (i.e., the all in focus image) in the mobile terminal according to an embodiment of the present invention, will be explained in more detail.

Figure 7:
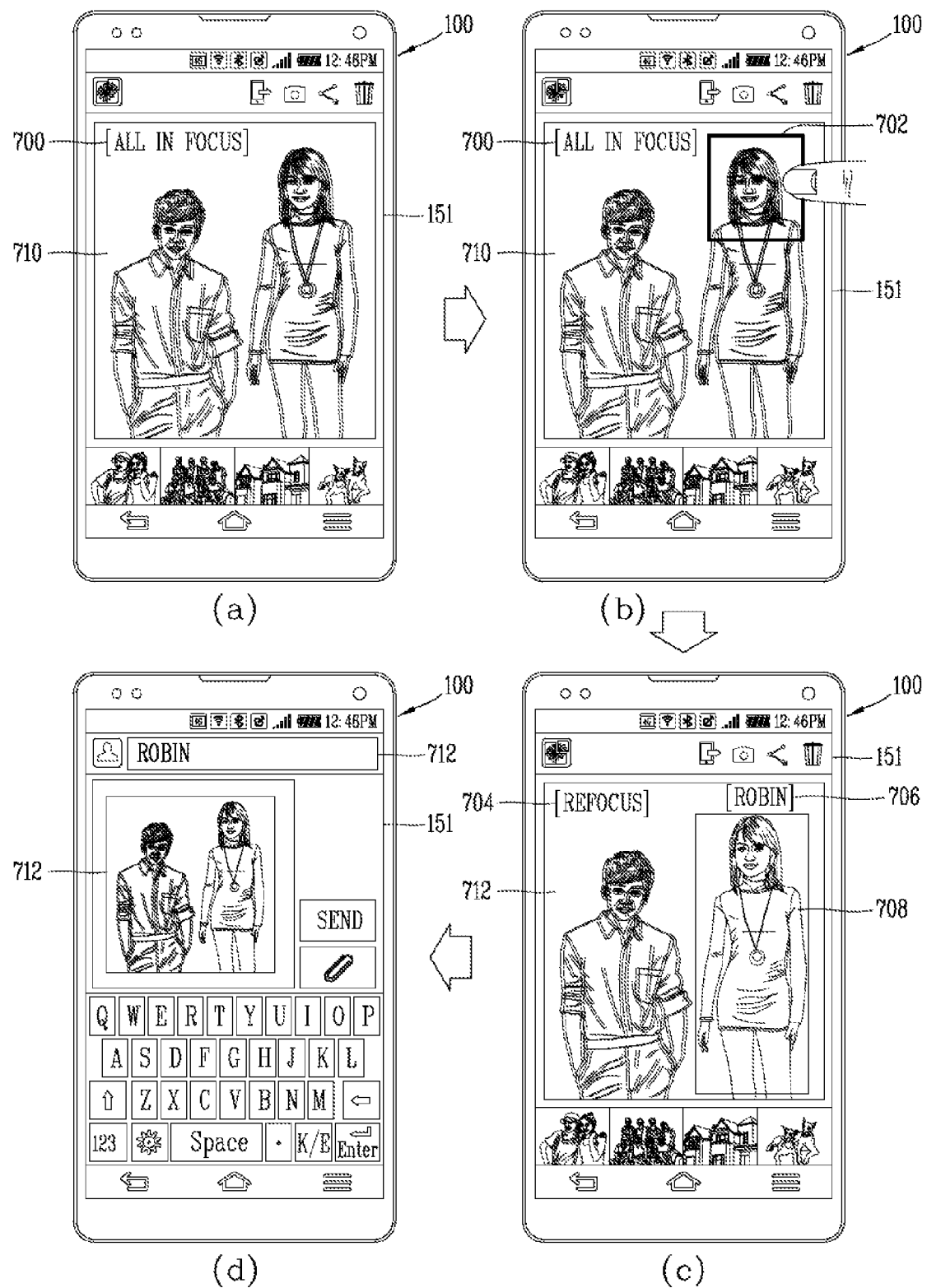
FIG. 7 is an view illustrating a process of determining a recipient to which an image is to be transmitted, and a process of changing a focal depth of the image according to the determined recipient, in a mobile terminal according to an embodiment of the present invention.

FIG. 7 is a view illustrating a process of determining a recipient to which an image is to be transmitted, and a process of changing a focal depth of the image based on the determined recipient, in a mobile terminal according to an embodiment of the present invention. FIG. 7(a) illustrates an all in focus image 710 according to an embodiment of the present invention. When the all in focus image has been displayed on the display unit 151, the controller 180 can display, on the display unit 151, a graphic object 700 informing a user that a currently-displayed image is an all in focus image. In this instance, the controller 180 of the mobile terminal 100 according to an embodiment of the present invention may change a focal depth of the all in focus image currently-displayed on the display unit 151, based on a specific subject, i.e., at least one of persons included in the image, according to a user's selection.

For instance, if a user touches one region on the display unit 151 where the all in focus image 710 has been displayed, the controller 180 can determine that the touched one region 702 of the all in focus image 710 has been selected by the user, as shown in FIG. 7(b). In this instance, the controller 180 can change a focal depth of the all in focus image 710 based on the one region 702 selected by the user. When a focal depth of the all in focus image 710 has been changed based on the specific region 702, the controller 180 can display, on the display unit 151, a graphic object 704 informing the user that the focal depth of the all in focus image has been changed.

More specifically, if the one region 702 of the all in focus image is selected by a user as shown in FIG. 7(b), the controller 180 can change a focal depth of the image 710 based on the selected region 702. For instance, the controller 180 can change (refocus) a focal depth of the image 710, based on a distance value between a lens and a subject, the distance value stored in pixels of the selected region 702.

Thus, a person 708 corresponding to the region 702 selected by the user may be correctly focused, whereas other people may be defocused. As a result, as shown in FIG. 7(c), the person 708 corresponding to the region 702 selected by the user can be displayed in a more distinct and clear manner than the other person.

The controller 180 can determine a recipient of the image having a changed focal depth, based on an image displayed on the region 702 selected by the user. That is, once one region 702 of the all in focus image 710 is selected by a user, the controller 180 can search for information on a person corresponding to the image displayed on the selected region 702, from pre-stored information on a plurality of persons (phone directory information or profile information), as described in S306 in FIG. 3. Then the controller 180 can determine a specific person as a recipient based on a search result.

Upon search of a specific person, the controller 180 can display the search result. That is, as shown in FIG. 7(c), the controller 180 can display 'ROBIN' 706, the search result, around the image 708 corresponding to the region 702 selected by the user. Then the user may check whether the recipient has been correctly selected or not, through the search result 'ROBIN' 706.

Upon determination of the recipient, the controller 180 can transmit the image 712 having a changed focal depth, to the determined recipient. For instance, as shown in FIG. 7(d), the controller 180 can immediately generate an e-mail or a message including the determined recipient's contact information. The image 712 having a changed focal depth may be attached to the e-mail or the message.

In FIG. 7, the image having a changed focal depth is transmitted to only a single recipient. However, in the mobile terminal 100 according to an embodiment of the present invention, the image may be transmitted to a plurality of recipients. If there are a plurality of recipients, the mobile terminal 100 may change a focal depth of an image based on each of the plurality of recipients, and may transmit the image having a changed focal depth to each of the recipients.

Figure 8:
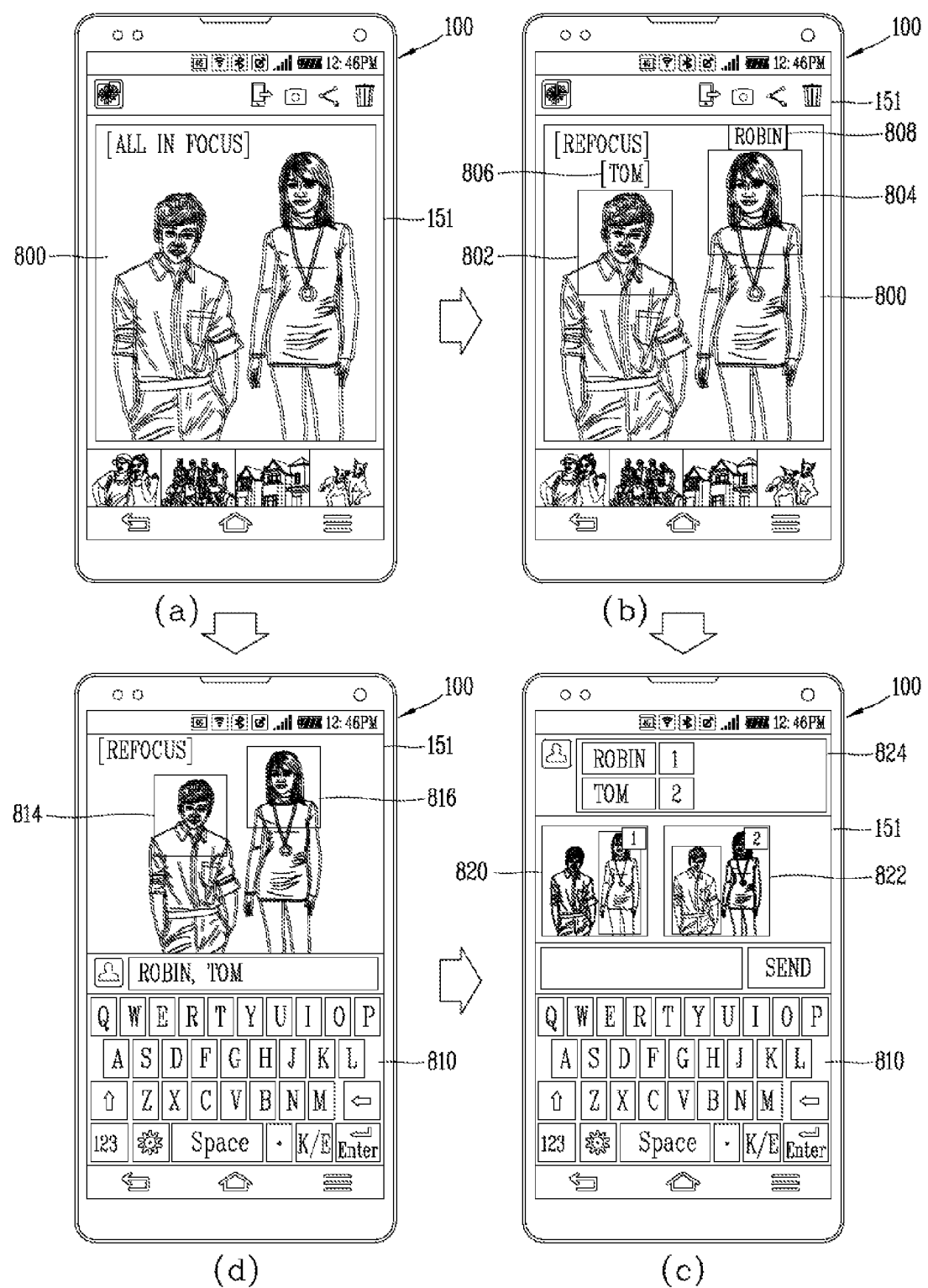
FIG. 8 is an view illustrating an example of images having changed focal depths, to a plurality of recipients, in a mobile terminal according to an embodiment of the present invention.

FIG. 8 is a view illustrating an example to transmit images each having a changed focal depth, to a plurality of recipients, in a mobile terminal according to an embodiment of the present invention. Referring to FIG. 8, the controller 180 of the mobile terminal 100 may receive a plurality of recipients from a user in various ways. For instance, as shown in FIG. 8(a), in a state where an all in focus image 800 has been displayed, the controller 180 can determine recipients who are to receive images each having a changed focal depth, based on regions selected by a user. In this instance, the controller 180 can determine the recipients, based on information on a key word directly input by a user.

For instance, if a plurality of touch inputs is sensed in a state where the all in focus image 800 has been displayed on the display unit 151, the controller 180 can generate regions 802 and 804 corresponding to the plurality of touch inputs as shown in FIG. 8(b). In this instance, the controller 180 can analyze images displayed on the regions 802 and 804, thereby searching for persons matching person information stored in a phone directory, etc. In this instance, the controller 180 can display graphic objects 806 and 808 indicating searched results, around the regions 802 and 804, as shown in FIG. 8(b). Thus a user can check whether recipients who are to receive the images have been correctly selected or not, based on the graphic objects 806 and 808.

Upon determination of the recipients, the controller 180 can generate images corresponding to the determined recipients. The generated images may be images having changed focal depths based on the determined recipients. That is, as shown in FIG. 8(b), when selected recipients who are to receive images are 'TOM' and 'ROBIN', the controller 180 can generate an image 822 having a focal depth changed based on 'TOM', and an image 820 having a focal depth changed based on 'ROBIN'. As shown in FIG. 8(c), an e-mail or a message to be transmitted to each of 'TOM' and 'ROBIN' may be generated.

In the mobile terminal 100 according to an embodiment of the present invention, recipients may be determined based on information directly input by a user. For instance, when the all in focus image 800 has been displayed as shown in FIG. 8(a), the controller 180 can display, on the display unit 151, image information 810 related to an input method editor (IME) according to a user's selection as shown in FIG. 8(d). Then the controller 180 can determine recipients who are to receive the images based on a user's inputs applied using the image information 810.

For instance, when keywords such as 'ROBIN' and 'TOM' have been input through the image information 810 as shown in FIG. 8(d), the controller 180 can search character images (person images) corresponding to the input keywords, from pre-stored person information. Then the controller 180 can detect regions on the all in focus image that correspond to the searched character images.

The detected regions may be displayed in a distinguished manner from other regions. For instance, the controller 180 can display the detected regions as guide lines 814 and 816, and may generate images having changed focal depths based on the detected regions. Thus, the controller 180 can determine persons corresponding to the input keywords, i.e., 'TOM' and 'ROBIN' as recipients. As shown in FIG. 8(*c*), the controller 180 can generate e-mails or messages including the images having changed focal depths.

In the above configuration, when a plurality of recipients has been selected, a plurality of images having changed focal depths based on the respective recipients are generated. However, a single image having a focal depth changed based on the plurality of recipients may be generated.

For instance, upon determination of a plurality of recipients of a transmission-requested image, the controller 180 can generate images having changed focal depths based on the respective determined recipients in a preset order. In this instance, the focal depths of the images may be repeatedly changed based on a preset period. The preset order or the preset period may be determined by a user who transmits the image.

The preset order may be an order that the plurality of regions have been selected by a user. When transmitting an image having its focal depths changed in a preset order, information on change of the focal depths may be transmitted by being included in the image. Thus, a mobile terminal, which has received an image having changed focal depths, may display the image on the display unit in the preset order.

In the above configuration, at least one recipient is selected, and a focal depth of the transmission-requested image is changed based on the selected recipient. However, a region where the focal depth is to be changed may be determined according to a user's selection.

For instance, the controller 180 of the mobile terminal according to an embodiment of the present invention may selectively receive, from a user, a plurality of regions among face-recognizable parts of the transmission-requested image. Upon selection of the plurality of regions, a focal depth of the transmission-requested image may be changed in a preset order based on each of the selected regions.

The selected regions may be regions where persons irrelevant to a recipient of the transmission-requested image have been displayed. In this instance, information on focal regions, a change order of focal depths, and a change period of the focal depths may be transmitted together with the transmission-requested image. Thus, a mobile terminal, which has received the image, may display change of the focal depths of the image on a display unit in the preset order.

In the previously mentioned configuration, once at least one region corresponding to a user's touch input has been selected from an all in focus image, a person displayed on the selected region is searched. However, the present invention may be implemented in a different order. For instance, when an all in focus image to be transmitted has been selected, the controller 180 can detect face-recognizable parts from the all in focus image. Then the controller 180 can display the detected parts in a distinguished manner from other parts. Then the controller 180 can perform face recognition with respect to each of the detected parts, thereby searching for matching persons from persons pre-stored in a phone directory, etc. Even if there is no user's selection, the controller 180 can display the searched results around the respective parts.

In this instance, a user may select a recipient of the image based on the searched results. The controller 180 can determine persons corresponding to one or more parts selected by a user, among the face-recognizable parts, as recipients of the image. Then the controller 180 can generate images having changed focal depths based on persons corresponding to the selected parts.

FIGS. 7 and 8 illustrate an example that one of pre-stored images is selected for transmission. However, the present invention is not limited to this. That is, the present invention may be also applicable to a case where an all in focus image is being captured.

More specifically, the mobile terminal according to an embodiment of the present invention may select a region where at least one specific person has been displayed, from even a non-stored image (i.e., a preview image), according to a user's touch input. Then the mobile terminal may change a focal depth of the preview image or a stored image, based on the selected region. The mobile terminal may not only store the image having a focal depth changed based on the specific person, but also transmit the image to the specific person.

Figure 9:
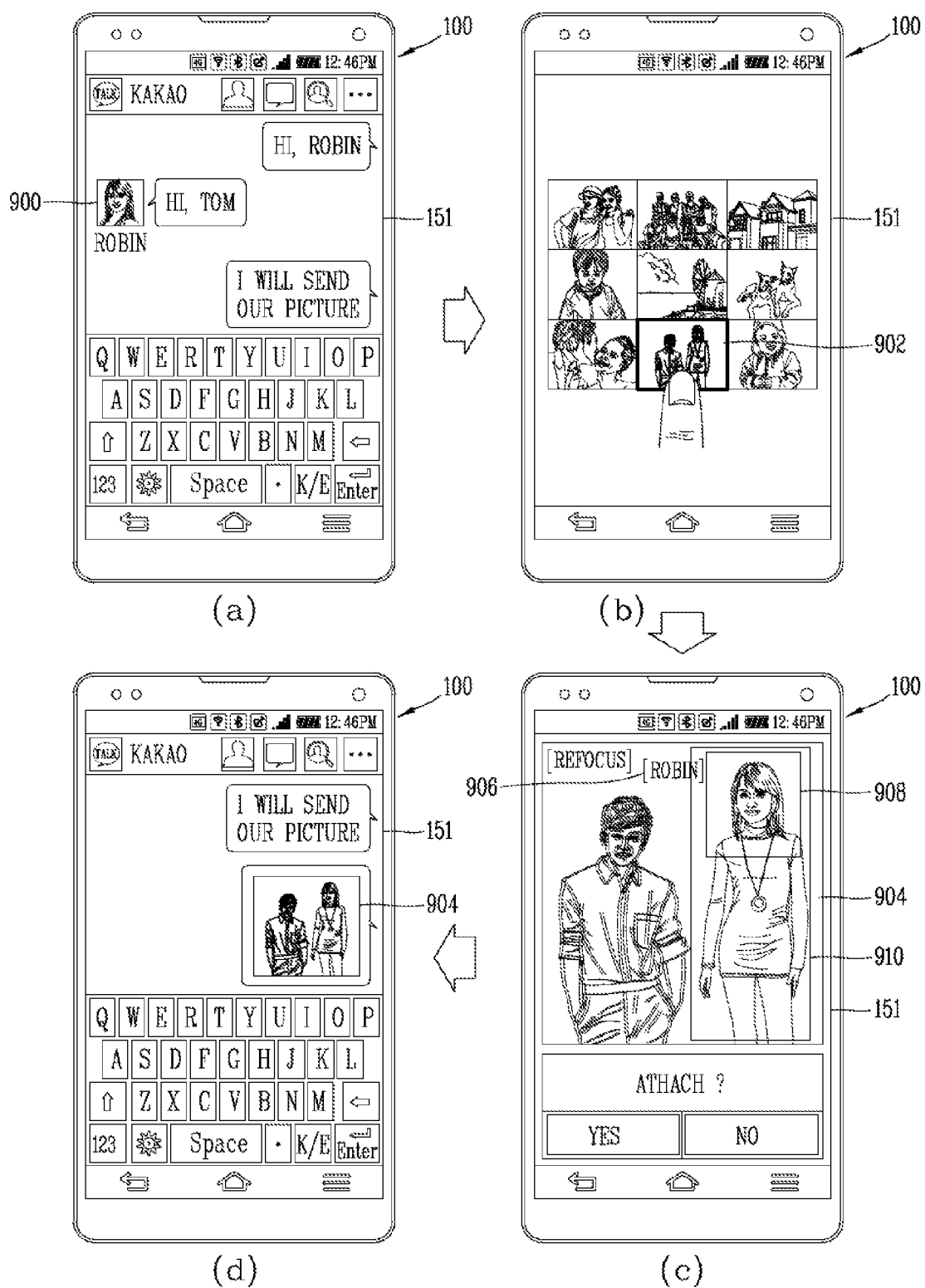
FIG. 9 is an view illustrating an example of transmitting an image having a focal depth changed, based on a chatting member, in a mobile terminal according to an embodiment of the present invention.

As previously mentioned, in the mobile terminal 100 according to an embodiment of the present invention, an image having a changed focal depth may be transmitted to a chatting member, according to a user's selection. This will be explained in more detail with reference to FIGS. 9, 10A and 10B. Referring to FIG. 9(*a*), when a user is chatting with a member using the mobile terminal, the controller 180 can transmit a pre-stored image to the chatting member according to the user's selection. As shown in FIG. 9(*b*), when a transmission-requested image 902 has been selected, the controller 180 changes a focal depth of the transmission-requested image 902 based on the current chatting member.

When chatting is performed, the controller 180 can collect an image on a user's chatting member. For instance, as shown in FIG. 9(*a*), when a chatting member uses a profile image 900 during chatting, the controller 180 can collect the profile image 900 as an image of the chatting member. Then the controller 180 can detect, from the transmission-requested image 902, a region 908 where the chatting member has been displayed, based on the collected profile image 900.

Upon selection of the region 908 where the chatting member has been displayed, the controller 180 can change a focal depth of the transmission-requested image 902 based on the region 908. For instance, the controller 180 can change a focal depth of the selected image, using a distance value between the camera and the subject, the distance value pre-stored in pixels of the selected region, or using an image captured by one of the plurality of lenses. Thus, as shown in FIG. 9(*c*), an image 910 corresponding to the region 908 may be focused. As shown in FIG. 9(*d*), the image having a changed focal depth may be uploaded to a chatting server, and a chatting member (ROBIN) may download the uploaded image.

As previously mentioned, in the mobile terminal according to an embodiment of the present invention, a transmission-requested image may be transmitted after its focal depth has been changed based on a recipient. A recipient of the transmission-requested image may be determined according to a function executed in the mobile terminal. As shown in FIG. 9, when the mobile terminal 100 performs a chatting function, a user's chatting member may be determined as a recipient of the transmission-requested image. Thus, as shown in FIG. 9(*c*), the transmission-requested image having a focal depth changed based on the chatting member may be transmitted to the chatting member.

When a user performs group chatting with a plurality of members, images having changed focal depths may be transmitted to the plurality of members, in a similar manner to the previously mentioned method. In the case of the group chatting, the controller 180 can preset an open range (public range) with respect to the image so that only part of the plurality of members can check the image uploaded by a user. In this instance, the open range may be predetermined based on information uploaded with the uploaded image, or may be determined by a specific condition.

Figure 10A:
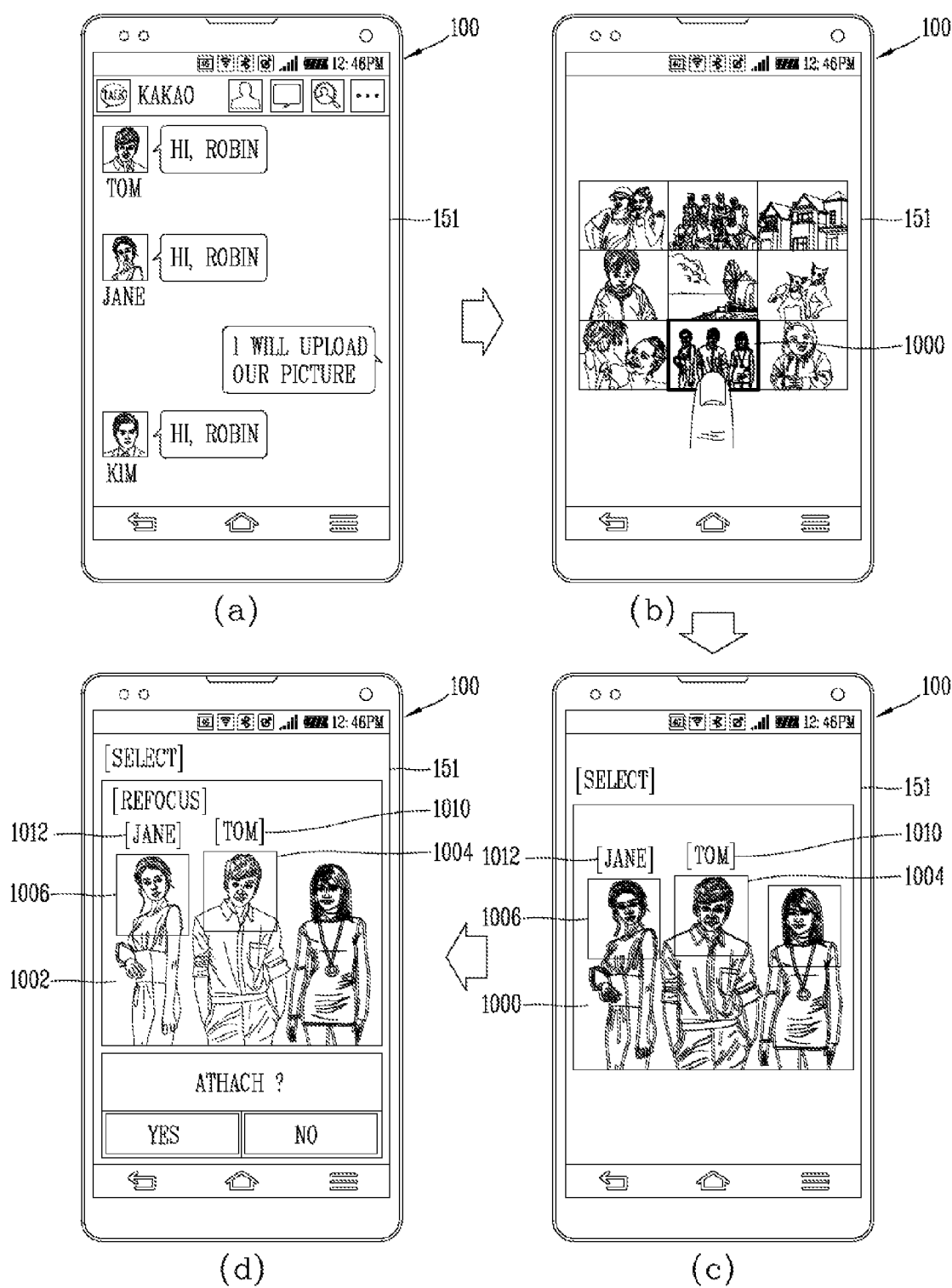
FIGS. 10A and 10B are views illustrating examples of uploading an image during group chatting, in a mobile terminal according to an embodiment of the present invention.
Figure 10B:
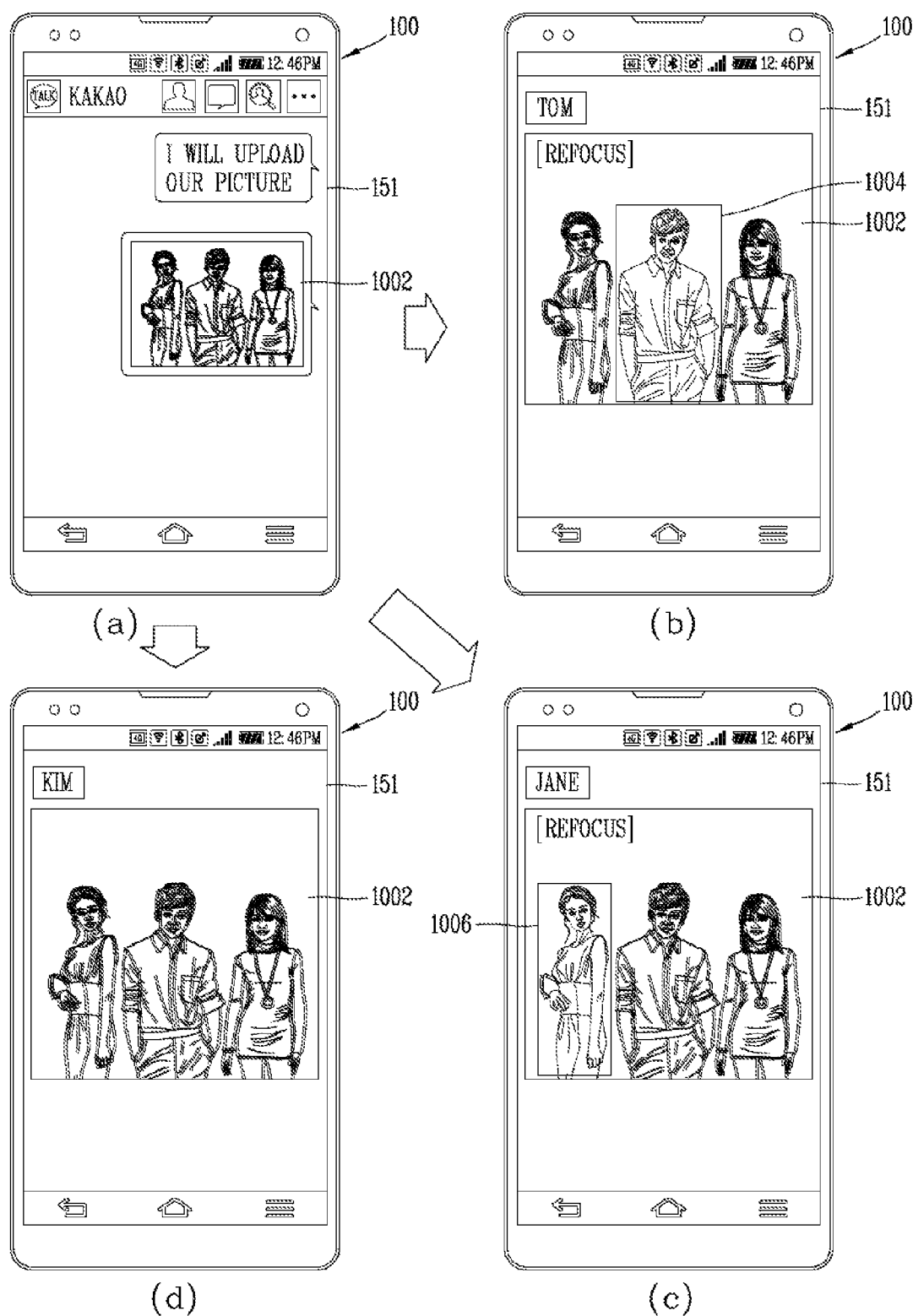

FIGS. 10A and 10B are views illustrating examples to upload an image while group chatting is performed in the mobile terminal according to an embodiment of the present invention. Referring to FIG. 10A(a), the mobile terminal 100 according to an embodiment of the present invention is performing group chatting with a plurality of members. As shown in FIG. 10A(b), the controller 180 can selectively receive, from a user, an image 1000 to be transmitted to at least part of the plurality of members, and may be provided with an open range of the selected image 1000.

For instance, as shown in FIG. 10A(c), a specific region may be selected from the selected image 1000, and only a person corresponding to the selected specific region may be allowed to view the selected image 1000. In this instance, the controller 180 can perform face recognition with respect to a region selected by a user, and may search for a person corresponding to the recognized face, from pre-stored person information, i.e., profile information stored in a phone directory, etc. In this instance, the controller 180 can display face-recognizable parts of the selected image 1000, and may display search results around the displayed regions as shown in FIG. 10A(c).

Referring to FIG. 10A(c), two regions 1006 and 1004, among three face-recognizable parts of the selected image 1000, correspond to the search results. In this instance, the controller 180 can display the search results on persons corresponding to the two regions 1006 and 1004, around the two regions 1006 and 1004. Thus, as shown in FIG. 10A(c), the controller 180 can display graphic objects 1012 and 1010 indicating the search result, around the two regions 1006 and 1004, respectively.

In this state, the controller 180 can receive, from a user, members allowed to view the selected image 1000. For instance, when a user selects at least one of the two regions 1006 and 1004 in a state where the search results have been displayed, the controller 180 can determine that only a person corresponding to the selected region is allowed to view the selected image.

The controller 180 can change a focal depth of the selected image 1000 based on persons set to view the image. For instance, as shown in FIG. 10A(d), the controller 180 can perform out-focusing with respect to other person rather than persons corresponding to the selected regions 1004 and 1006, based on a pre-stored distance value between the camera and the subject. Alternatively, the controller 180 can generate an image having a focal depth changed so that persons corresponding to the selected regions 1004 and 1006 can be focused, by re-synthesizing an image using images received from lenses used to capture persons corresponding to the selected regions 1004 and 1006.

In the above configuration, persons allowed to view the image are set based on pre-stored person information. However, not only pre-stored person information, but also information collected from a chatting server may be utilized.

For instance, the controller 180 can collect information on other members registered to a chatting group to which a user belongs, from a chatting server. More specifically, as shown in FIG. 10A(a), when a user performs group chatting with three members, ('TOM', 'JANE' and 'KIM'), the controller 180 can collect information on the three members. The collected information may be information allowed to be open to others by the members. That is, the information may be profile images, IDs or names used for chatting. In this instance, the information such as profile images, IDs or names may be collected by the mobile terminal 100 according to an embodiment of the present invention.

In this instance, the controller 180 can set persons to which the selected image 1000 can be open, based on the collected information. That is, the controller 180 can perform face recognition with respect to face-recognizable parts of the selected region 1000, based on the collected information. In this instance, the controller 180 can detect, from the selected image 1000, regions where the chatting members have been displayed. Then the controller 180 can display, on the display unit 151, graphic objects 1012 and 1010 indicating information on a chatting members corresponding to images displayed on the detected regions.

In this state, the controller 180 can receive, from a user, members allowed to view the selected image 1000. For instance, when a user selects at least one of the two regions 1006 and 1004 in a state where the search results have been displayed as shown in FIG. 10A(c), the controller 180 can determine that only a person corresponding to the selected region is allowed to view the selected image.

Upon determination of an open range, the controller 180 can upload information on the determined open range, i.e., information on specific persons allowed to view the selected image 1000, to a chatting server together with the selected image 100 to be uploaded. For instance, when 'TOM' and 'JANE' have been allowed to view the selected image 1000, the controller 180 can upload identification information of the 'TOM' and 'JANE' by being included in the selected image 1000. The identification information may be open information on the specific persons allowed to view the selected image, e.g., identifications (IDs) or names. For prevention of leakage of person information, the identification information may be encoded by a preset security means, etc.

Once the image having a set open range is uploaded to the chatting server, other members who are chatting with the user may download the uploaded image. However, when an open range has been set to the uploaded image, the mobile terminal 100 which has downloaded the uploaded image may restrict display of the uploaded image based on pre-stored person information, as shown in FIG. 10B.

When uploading an image as shown in FIG. 10B(a), the members who are chatting with the user may download the uploaded image. The controller 180 of the mobile terminal 100 which has downloaded the uploaded image may check whether an open range has been set to the downloaded image or not (See FIG. 6). If so, the controller 180 can compare pre-stored information on a user of the mobile terminal 100 with information set to the open range, thereby determining whether the user of the mobile terminal 100 which has downloaded the uploaded image is an allowed person or not. The controller 180 can display the downloaded image or may not display the downloaded image, according to a determination result.

For instance, as shown in FIG. 10A, when an image allowed to be viewable only by 'TOM' and 'JANE' among the chatting members has been downloaded, the downloaded image may be displayed only on mobile terminals having user information corresponding to 'TOM' and 'JANE'.

More specifically, as shown in FIG. 10B(b), when user information stored in the mobile terminal which has downloaded the image corresponds to 'TOM', the controller 180 can display the downloaded image without any restrictions. Further, as shown in FIG. 10B(b), the controller 180 can change a focal depth of the downloaded image, based on a region of the downloaded image, i.e., a region 1004 where 'TOM', a user of the mobile terminal 100 has been displayed.

FIG. 10B(c) illustrates an example that a mobile terminal of other user allowed to view the selected image ('JANE') has downloaded an image. As shown in FIG. 10B(c), information set to an open range of the downloaded image may match information on a user who has downloaded the image. Thus, the controller 180 can display the downloaded image without any restrictions. Further, the controller 180 can change a focal depth of the downloaded image, based on a region of the downloaded image, i.e., a region 1006 where 'JANE', a user of the mobile terminal 100 has been displayed.

However, if information set to an open range of the downloaded image does not match information on a user who has downloaded the image, display of the downloaded image may be restricted. For instance, as shown in FIG. 10A(a), when 'KIM', a chatting member who is not allowed to view the uploaded image has downloaded the image, the controller 180 can compare information set to an open range of the downloaded image, with user information pre-stored in the mobile terminal, thereby determining that 'KIM', a user of the mobile terminal which has received the image is not an allowed person. In this instance, as shown in FIG. 10B(d), the controller 180 can display the selected image in the form of an out-focused image, a black-and-white image, or an image having a resolution of a predetermined level or less than.

With reference to FIGS. 10A and 10B, it has been explained that information set as an open range of the uploaded image is information on specific persons. However, the open range may be set in the form of a specific condition.

Figure 11:
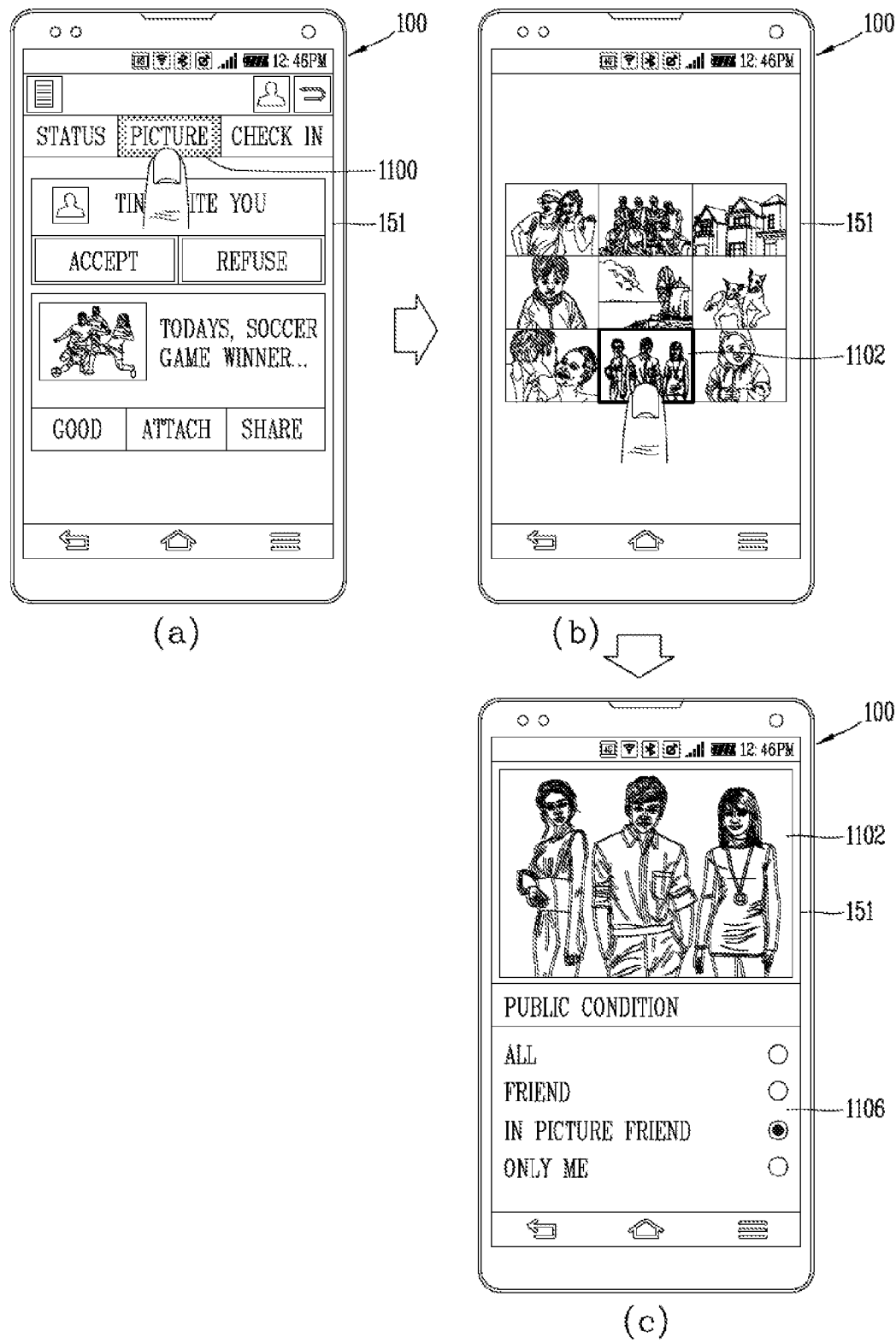
FIG. 11 is a view illustrating an image uploaded to an SNS bulletin board, in a mobile terminal according to an embodiment of the present invention.

FIG. 11 is a view illustrating an image uploaded to an SNS bulletin board in the mobile terminal according to an embodiment of the present invention. As shown in FIG. 11(a), a user may select to upload an image to an SNS server to which the user has subscribed. In this instance, the controller 180 can control an image 1102 selected by a user, among pre-stored images, to be uploaded to the SNS server. Also, the controller 180 can be provided with an open range of the image set by the user. The open range of the image 1102 may be set in the form of a condition, according to a user's selection, as shown in FIG. 11(c).

The controller 180 can set various types of open conditions at the time of uploading the image 1102. For instance, as shown in FIG. 11(c), the open range may be all (ALL), a specific group or designated persons (FRIEND), persons included in the image (IN PICTURE FRIEND), or only the user (ONLY ME).

Upon setting of the open condition, a mobile terminal which has downloaded the image may determine whether to display the image or not according to the open range. For instance, if the open range corresponds to all (ALL), the controller 180 of the mobile terminal 100 which has received the image may display the downloaded image without any restrictions. In this instance, the controller 180 can detect a region where a pre-stored user has been displayed, from the downloaded image. Then the controller 180 can change a focal depth of the downloaded image based on the detected region. On the contrary, if the open range corresponds to the user (ONLY ME), the controller 180 of the mobile terminal 100 which has received the image may display the downloaded image in the form of an out-focused image or a black-and-white image.

If the open range corresponds to a specific group or designated persons (FRIEND), the controller 180 can display the downloaded image to members of the specific group set by the user, or the designated persons set by the user, without any restrictions. In this instance, the controller 180 can receive, from the user, information on the members or the designated persons allowed to view the image 1102.

If the open range corresponds to persons included in the image (IN PICTURE FRIEND), the controller 180 of the mobile terminal 100 which has received the image 1102 may detect a region where a pre-stored user has been displayed, from the downloaded image. If a region where a pre-stored user has been displayed is detected from the downloaded image, the controller 180 can display the downloaded image on the display unit 151. In this instance, the controller 180 can display an image having a focal depth changed based on the region where the pre-stored user has been displayed.

On the contrary, if a region where a pre-stored user has been displayed is not detected from the downloaded image, the controller 180 can restrict display of the downloaded image. In this instance, the controller 180 can display the downloaded image in the form of an out-focused image or a black-and-white image as previously mentioned.

Figure 12:
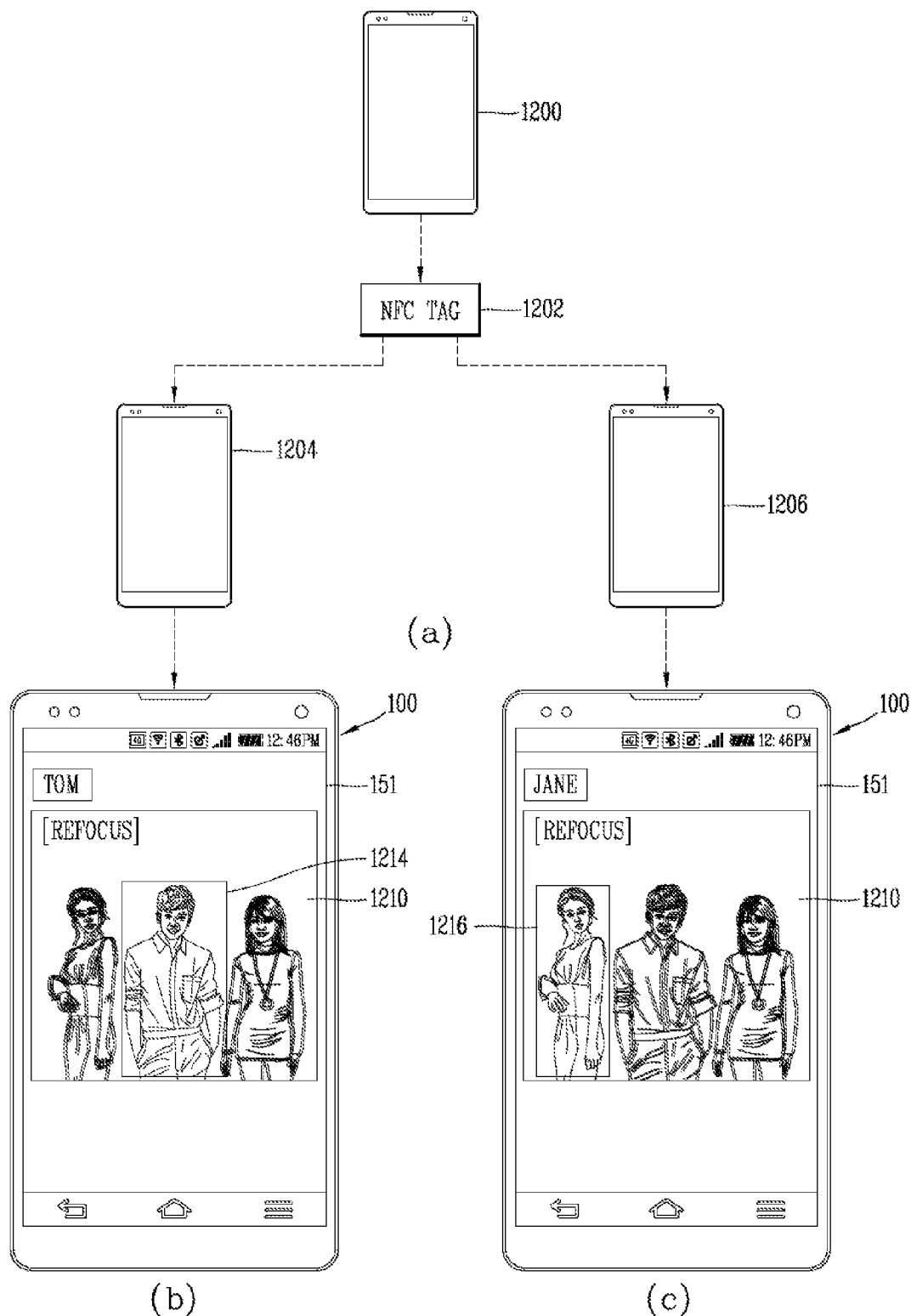
FIG. 12 is an view illustrating that an image is transmitted to other mobile terminals through an NFC tag, in a mobile terminal according to an embodiment of the present invention.

The mobile terminal 100 according to an embodiment of the present invention may transmit an image using a peripheral device such as a near field communication (NFC) tag. FIG. 12 is a view illustrating an example to transmit an image to other mobile terminals from the mobile terminal according to an embodiment of the present invention, through an NFC tag.

Referring to FIG. 12, a user of a first mobile terminal 1200 may transmit a pre-stored image to other mobile terminals 1204 and 1206, through an NFC tag 1202. In this instance, the image provided from the first mobile terminal 1200 may be transmitted to the second mobile terminal 1204 and the third mobile terminal 1206 connectable to the first mobile terminal 1200 through the NFC tag.

In this instance, controllers of the second mobile terminal 1204 and the third mobile terminal 1206 may detect a region where a pre-stored user has been displayed, from the image transmitted through the NFC tag 1202. Then the controllers may determine whether to receive the transmitted image or not, or whether to display the received image or not, according to detection results.

If a region where a pre-stored user has been displayed is detected from the image transmitted through the NFC tag 1202, the controllers of the second mobile terminal 1204 and the third mobile terminal 1206 may display the received image on the display unit 151, after changing focal depths of the received image based on regions where pre-stored users 1214 and 1216 have been displayed. FIGS. 12(b) and 12(c) illustrate such examples.

Unlike in the previously mentioned configuration, the first mobile terminal 1200 may set an open range of an image while transmitting the image. In this instance, the controllers of the second mobile terminal 1204 and the third mobile terminal 1206 may receive information set as the open range of the image, thereby determining whether the users correspond to the open range. According to a determination result, the controllers may display the received image having changed focal depths as shown in FIGS. 12(b) and 12(c). Alternatively, the controllers may not receive the image transmitted from the NFC tag 1202, or may display the received image in the form of an out-focused image or a black-and-white image.

In FIG. 12, the first mobile terminal 1200 transmits an image to the second mobile terminal 1204 and the third mobile terminal 1206. However, image transmission may be performed in a different manner. That is, when the first mobile terminal 1200 receives identification information on the second mobile terminal 1204 and the third mobile terminal 1206 from the second mobile terminal 1204 and the third mobile terminal 1206, the first mobile terminal 1200 may transmit a transmission-requested image in response to the received identification information. In this instance, the first mobile terminal 1200 may determine whether users of the second mobile terminal 1204 and the third mobile terminal 1206 match a preset open range, based on the received identification information.

So far, it has been explained that the mobile terminal according to an embodiment of the present invention transmits an image having a changed focal depth. However, as previously mentioned, the mobile terminal according to an embodiment of the present invention may transmit a focus changeable image according to whether a receiving terminal supports a refocusing function or not, i.e., an all in focus image. Hereinafter, an example, where the mobile terminal according to an embodiment of the present invention who has received a focus changeable image changes a focal depth of the received image, will be explained in more detail with reference to the attached drawings.

Figure 13:
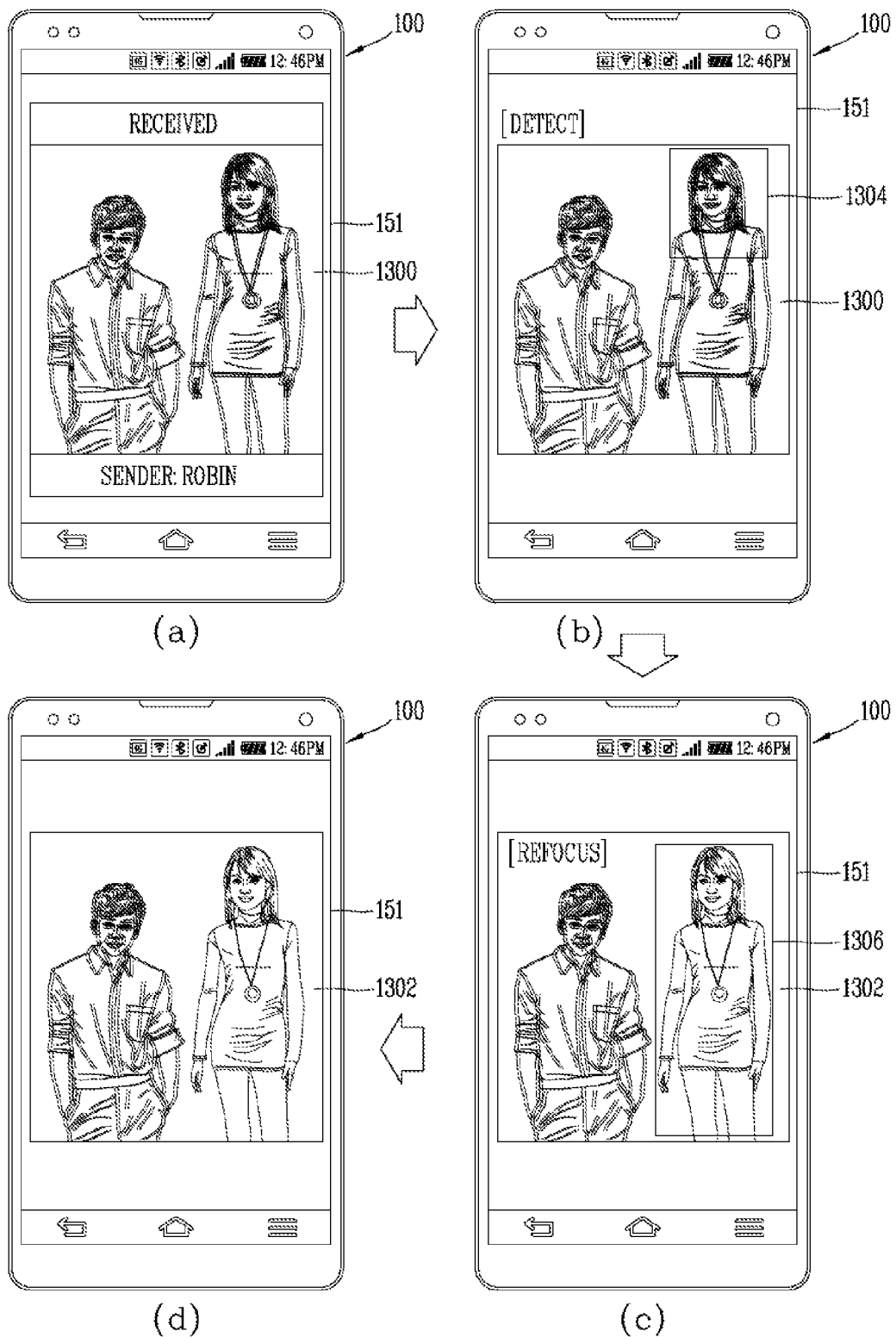
FIG. 13 is an view illustrating that a focal depth of a received image is changed based on information on a pre-stored user, in a mobile terminal according to an embodiment of the present invention.

FIG. 13 illustrates an example that the mobile terminal according to an embodiment of the present invention, which has received a focus changeable image, changes a focal depth of the received image based on pre-stored user information. When a focus changeable image 1300 has been received as shown in FIG. 13(a), the controller 180 of the mobile terminal 100 according to an embodiment of the present invention may detect, from the received image, a region 1304 where a pre-stored user has been displayed as shown in FIG. 13(b). For instance, the controller 180 can recognize feature points of a user's face, i.e., a shape of eyes, a nose and a mouth, a distance therebetween, an outline thereof, etc., based on a user's image included in pre-stored profile information on the user. Then the controller 180 can detect a region where the user has been displayed, from the received image, based on the recognized information.

As shown in FIG. 13(b), if the region where a pre-stored user has been displayed is detected from the received image, the controller 180 can change a focal depth of the received image based on the region. For instance, the controller 180 can change a focal depth of the received image, using a distance value pre-stored in pixels of the region where the user has been displayed, the distance value between the camera and the subject. Thus, as shown in FIG. 13(c), a focal depth of the received image may be changed so that an image 1306 corresponding to the detected region 1304 can be focused.

Upon completion of the focus changing process, the controller 180 can display an image having a changed focal depth on the display unit 151 as shown in FIG. 13(d). When the mobile terminal 100 according to an embodiment of the present invention has received a focus changeable image, the mobile terminal 100 may change a focal depth of the received image, based on a region where a pre-stored user has been displayed. Thus, an image focused in a more distinct and clear manner may be provided to the user.

Figure 14:
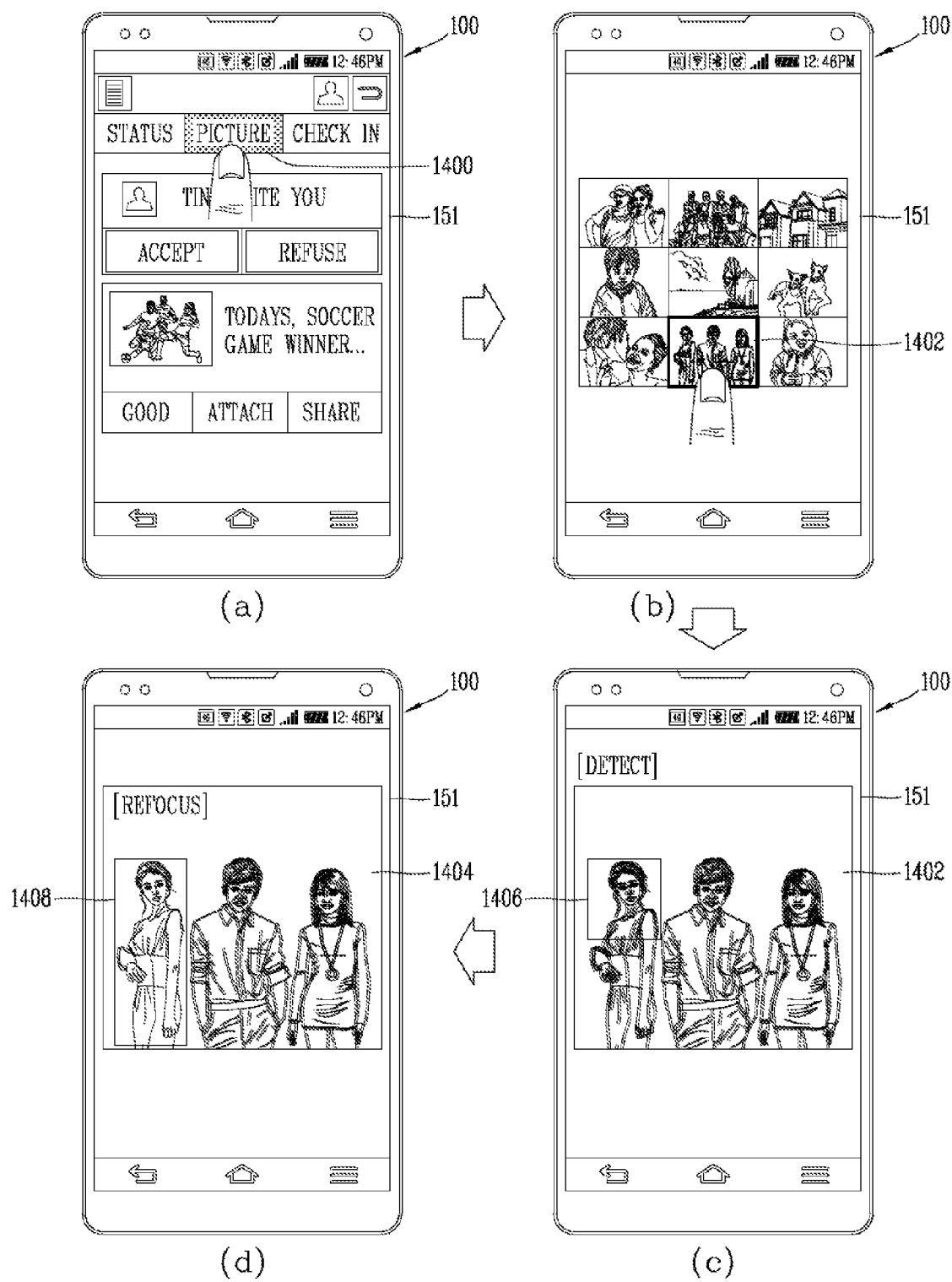
FIG. 14 is an view illustrating that an image is downloaded from an SNS bulletin board, in a mobile terminal according to an embodiment of the present invention.

The present invention may be applicable to a case of downloading an image posted to an SNS server, etc., as well as a case of receiving an image from other mobile terminal, in a similar manner. FIG. 14 illustrates an example to download an image from an SNS bulletin board by the mobile terminal according to an embodiment of the present invention.

Referring to FIGS. 14(a) and (b), when a user has downloaded a specific image 1402 from a plurality of images posted to an SNS server, the controller 180 can determine whether the downloaded image is a focus changeable image or not. If the downloaded image is a focus changeable image, the controller 180 can detect, from the downloaded image, a region where a pre-stored user has been displayed.

As shown in FIG. 14(c), when a region 1406 where a pre-stored user has been displayed is detected from the downloaded image, the controller 180 can change a focal depth of the downloaded image based on the detected region 1406. Thus, when an image has been downloaded from an SNS server, etc., the mobile terminal 100 according to an embodiment of the present invention may change a focal depth of the downloaded image based on a region 1408 where a pre-stored user has been displayed as shown in FIG. 14(d).

The mobile terminal according to an embodiment of the present invention may change a focal depth of an image based on a situation where the image has been displayed. For instance, when a text related to the uploaded image is input, the controller 180 can change a focal depth of the image based on a region of the image, according to the input text. Alternatively, the mobile terminal may change a focal depth of an image based on a function currently executed by the mobile terminal.

Figure 15:
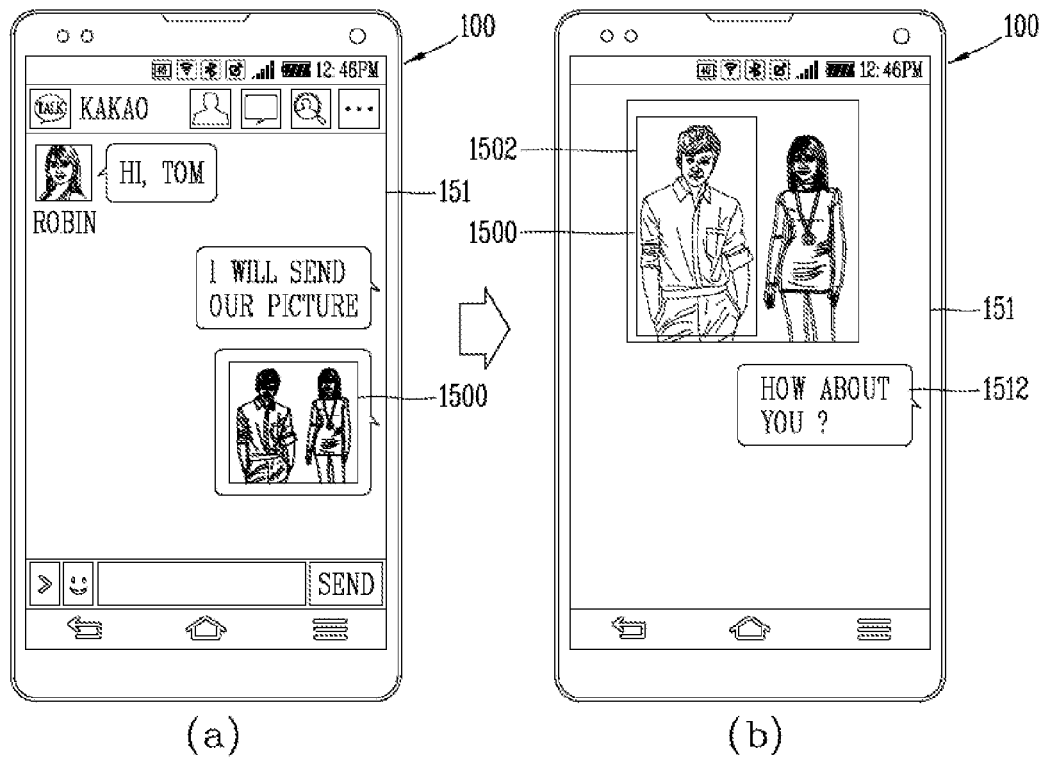
FIG. 15 is an view illustrating that a focal depth of an image is changed according to a user who is inputting a dialogue during chatting, in a mobile terminal according to an embodiment of the present invention.
Figure 15:
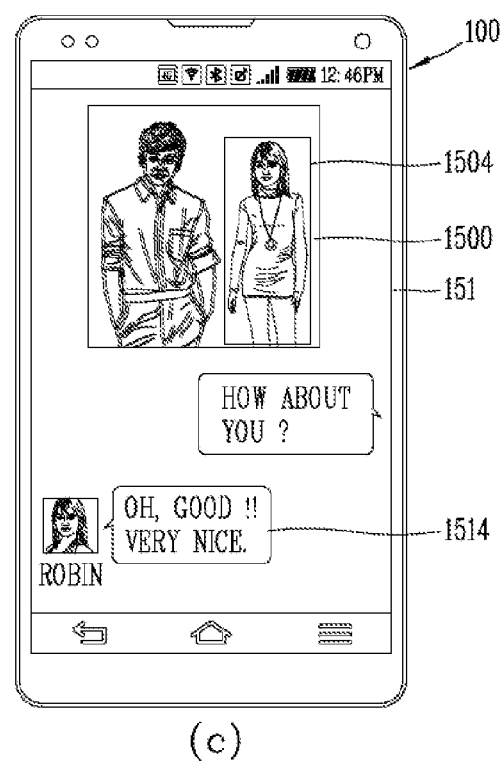

For instance, when a focus changeable image is posted during chatting, the mobile terminal according to an embodiment of the present invention may change a focal depth of an image, based on a user who is inputting a dialogue (a text). FIG. 15 is a view illustrating an example that a focal depth of an image is changed based on a person who is inputting a text during chatting, in the mobile terminal according to an embodiment of the present invention.

Referring to FIG. 15(a), when a user posts an image 1500 during chatting, the controller 180 of the mobile terminal 100 which has posted the image may change a focal depth of the posted image based on a person who is inputting a text.

As shown in FIG. 15(b), when the user who has posted the image has input a dialogue (first text: 1512), the controller 180 can detect, from the posted image 1500, a region where the user of the mobile terminal 100 (i.e., the person who has input the first text) has been displayed. For instance, the controller 180 can detect, from the posted image 1500, a region matching a pre-stored user's image. Then the controller 180 can change a focal depth of the posted image based on the detected region. Thus, as shown in FIG. 15(b), a focal depth of the uploaded image 1500 may be changed based on the region 1502 where the person who has input the dialogue (i.e., the user) has been displayed.

Under this state, if a chatting member, i.e., 'ROBIN' of FIG. 15 has input a dialogue (second text: 1514), the controller 180 can detect, from the uploaded image 1500, a region 1504 where 'ROBIN' has been displayed. For instance, the controller 180 can detect, from the uploaded image 1500, the region 1504 where 'ROBIN' has been displayed, based on information on 'ROBIN' collected by the chatting server. Upon detection of the region where 'ROBIN' has been displayed, the controller 180 can change a focal depth of the posted image 1500 based on the detected region. FIG. 15(c) illustrates such example.

In the above configuration, the mobile terminal 100 which has posted the image 1500 changes a focal depth of the posted image. However, another mobile terminal which displays the posted image may change a focal depth of the posted image, in the same manner.

For instance, another mobile terminal which displays the posted image 1500, i.e., ROBIN's mobile terminal may collect information on 'TOM' from the chatting server. Then that mobile terminal may detect, from the posted image, regions where 'TOM' and 'ROBIN' have been displayed, based on collected information. That mobile terminal may change a focal depth of the posted image, based on a user who is inputting a dialogue during chatting. As shown in FIG. 15, when an image has been posted, both a mobile terminal which has posted the image and a mobile terminal which is to display the posted image may display an image having a focal depth changed based on a user who has input a dialogue.

When a text related to a pre-stored image has been input, the controller 180 of the mobile terminal according to an embodiment of the present invention may change a focal depth of the image, based on the input text. For instance, when a user changes a title of a pre-stored image, the controller 180 can change a focal depth of the image based on the input text.

Figure 16:
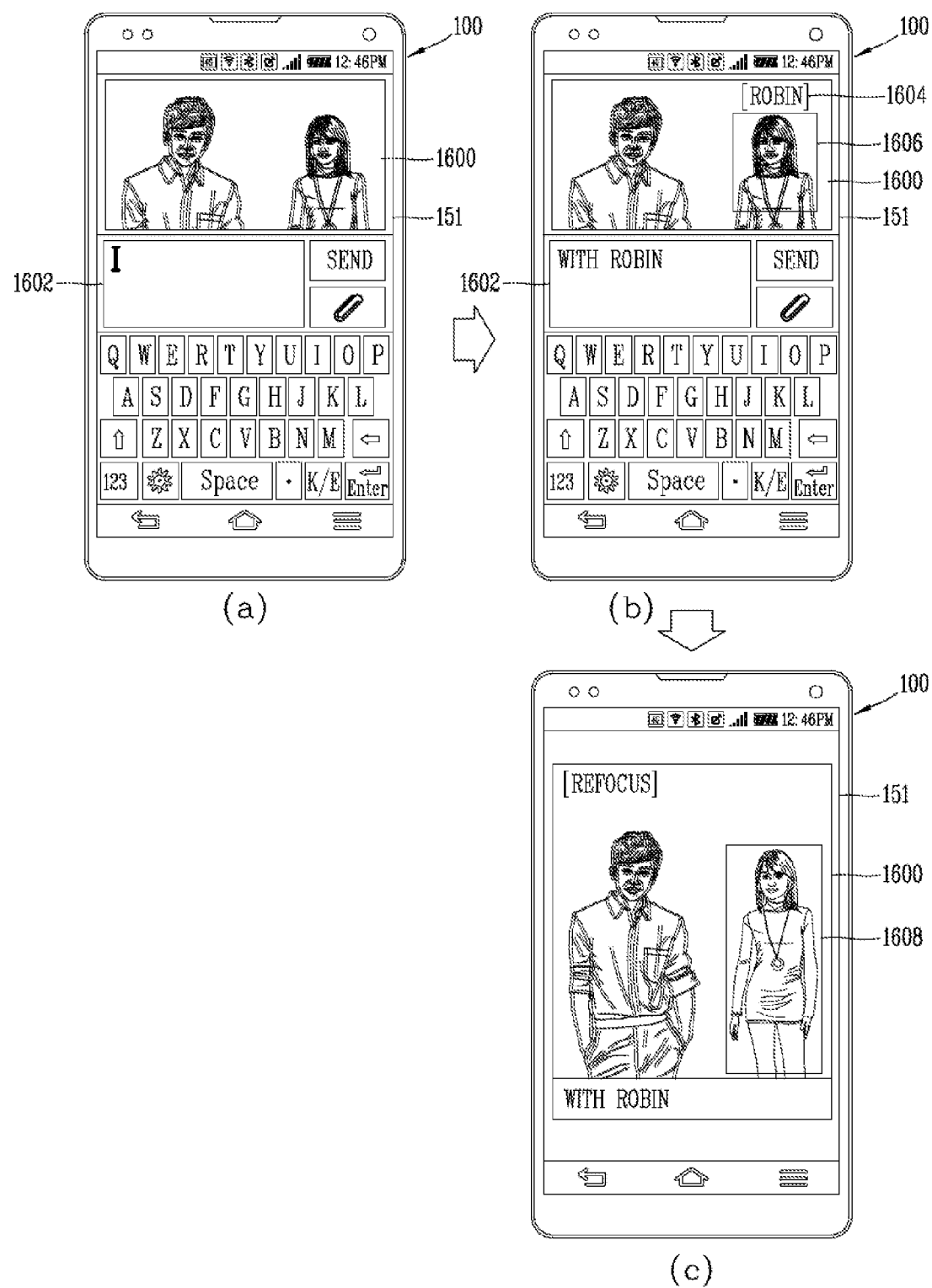
FIG. 16 is a view illustrating that a focal depth of an image is changed based on an input text, when inputting a text related to the image, in a mobile terminal according to an embodiment of the present invention.

FIG. 16 illustrates an example to change a focal depth of an image based on an input text, when a text related to the image has been input in the mobile terminal according to an embodiment of the present invention. Referring to FIGS. 16(a) and (b), when a text related to a pre-stored image 1600 has been input, the controller 180 of the mobile terminal 100 may sense the input text. In this instance, the controller 180 can search for person information corresponding to the input text. The person information may be pre-stored in a phone directory stored in the memory 170. Upon search of person information corresponding to the input text, the controller 180 can detect a region of the image 1600 based on the searched person information. The controller 180 can display a graphic object 1604 indicating the searched result, around the detected region. FIG. 16(b) illustrates such example.

As shown in FIG. 16(b), upon detection of a region where a person matching the input text has been displayed, the controller 180 can change a focal depth of the image based on the detected region. The focal depth of the image may be changed as shown in FIG. 16(c). Thus, in the mobile terminal 100 according to an embodiment of the present invention, an image 1608 corresponding to a text input by a user can be displayed in a more distinct and clear manner. The image 1608 included in the image may be stored.

The mobile terminal and the control method thereof according to an embodiment of the present invention may have the following advantages. In at least one of the embodiments of the present invention, an image is transmitted to a recipient after its focal depth has been changed based on the recipient. In at least one of the embodiments of the present invention, a focal depth of a received image is changed based on a user, on the basis of pre-stored user's identification information. Thus, the user can be provided with an image focused on himself or herself.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a display;
a camera configured to capture an image, the captured image being re-focusable;
a memory configured to store face images of a plurality of persons and person information associated with each of the stored face images; and
a controller configured to:
display the captured image on the display,
perform face recognition with respect to the captured image and display at least one graphic object indicating a result of the face recognition around face-recognizable parts of the captured image, the graphic object including person information corresponding to a face image recognized from the captured image among the stored face images,
determine an identified recipient of the captured image in response to an input applied to the at least one face-recognizable part of the captured image,
receive a text input related to the captured image in response to a transmission request of the captured image,
detect on the captured image a person corresponding to the text input based on the stored face images,
change a focal depth of the captured image based on the person corresponding to the text input when the text input matches at least partially or wholly one of the person information associated with each of the stored face images, and
transmit the captured image with the changed focal depth to the identified recipient.

2. The mobile terminal of claim 1, wherein, when the at least one face-recognizable part includes a plurality of face-recognizable parts, the controller is configured to provide visible information for each of the face-recognizable parts in a corresponding plurality of regions, and
wherein, when the plurality of regions are selected in an order by a user, the controller is configured to change a focal depth of the captured image in the order based on selection of the selected regions.

3. The mobile terminal of claim 1, wherein the controller is configured to determine the identified recipient of the captured image based on a function of the mobile terminal being performed at the time that the transmission request is received.

4. The mobile terminal of claim 3, wherein, when the function is a chatting function with at least one chatting member, the controller is configured to change the focal depth of the captured image based on the at least one chatting member, and then to transmit the at least one image having the changed focal depth to the at least one chatting member.

5. The mobile terminal of claim 3, wherein, when the function is a social network service (SNS) function, the controller is configured to determine at least a portion of subscribers of the SNS as recipients of the captured image, and then to upload information on the determined subscribes and the captured image to a web space for the SNS.

6. The mobile terminal of claim 1, wherein, when the identified recipient of the captured image is determined, the controller displays the captured image having the focal depth changed based on the determined recipient on at least part of the display, and
wherein, when the determined recipient is plural in number, the controller displays the captured image such that one captured image having the focal depth changed based on one of the determined recipients is distinguished from another captured image having a focal depth changed based on another of the determined recipients.

7. The mobile terminal of claim 1, wherein the camera is an array camera having a plurality of lenses arranged in a matrix,
wherein the controller is configured to synthesize images input through the plurality of lenses, based on an image input through one of the lenses having a focal depth corresponding to the identified recipient, among images input through the plurality of lenses, and
wherein the controller is configured to perform the refocusing with respect to the synthesized image.

8. A mobile terminal, comprising:
a display;
a controller configured to change a focal depth of a re-focusable image when the re-focusable image has been received by the mobile terminal; and
a memory configured to store person information associated with each of stored face images,
wherein, when the mobile terminal receives the re-focusable image, the controller is further configured to:
perform face recognition with respect to the re-focusable image and display at least one graphic object indicating a result of the face recognition around face-recognizable parts of the re-focusable image, the graphic object including person information corresponding to a face image recognized from the re-focusable image among the stored face images,
receive a text input related to the re-focusable image, and
change the focal depth of the re-focusable image based on a person corresponding to the text input when the text input matches at least partially or wholly one of the person information associated with each of the stored face images.

9. The mobile terminal of claim 8, wherein the stored person information related to the user includes preset identification information,
wherein the controller is configured to receive the re-focusable image from a social network service (SNS) server to which the user has accessed, and
wherein the controller changes the focal depth of the re-focusable image or restricts display of the re-focusable image based on whether recipient information associated with the received image matches the preset identification information of the user.

10. The mobile terminal of claim 9, wherein when the display of the re-focusable image is restricted, the controller is configured to display the re-focusable image in the form of a black-and-white image or a lower resolution image than the received re-focusable image.

11. The mobile terminal of claim 8, wherein the controller is configured to transmit the preset identification information of the user to other neighboring mobile terminals through a near field communication (NFC) tag, and
wherein the controller receives the re-focusable image from one of said other neighboring mobile terminals and changes the focal depth of the re-focusable image.

12. The mobile terminal of claim 8, wherein, upon receipt of information on a plurality of focal regions of the received image and information on a preset order to change the focal regions of the received image, the controller changes focal depths of the received image in the preset order based on parts of the received image which correspond to the focal regions.

13. A mobile terminal, comprising:
a display;
a controller configured to change a focal depth of a re-focusable image when the re-focusable image has been received by the mobile terminal; and
a memory configured to store information related to a user of the mobile terminal, the information including pre-stored face images,
wherein the controller is further configured to:
collect information on other members who are chatting with a user from a chatting server to which the user has accessed, and
change the focal depth of the re-focusable image based on the pre-stored face images or the collected information on said other members when the re-focusable image is received from the chatting server, and
wherein, when text input by a member from the other members is displayed during chatting, the controller is configured to determine a region in the re-focusable image that corresponds to collected information from said member and to display the re-focusable image having the changed focal depth based on the detected region.

* * * * *